(12) United States Patent
Kitazawa et al.

(10) Patent No.: US 9,185,345 B2
(45) Date of Patent: Nov. 10, 2015

(54) VIDEO CONFERENCE SYSTEM AND METHOD FOR PERFORMING THE SAME

(71) Applicants: Kazuki Kitazawa, Kanagawa (JP); Masato Takahashi, Tokyo (JP)

(72) Inventors: Kazuki Kitazawa, Kanagawa (JP); Masato Takahashi, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 142 days.

(21) Appl. No.: 14/022,772

(22) Filed: Sep. 10, 2013

(65) Prior Publication Data

US 2014/0078244 A1    Mar. 20, 2014

(30) Foreign Application Priority Data

Sep. 14, 2012  (JP) ................................ 2012-203698
Mar. 11, 2013  (JP) ................................ 2013-048503
Jul. 3, 2013   (JP) ................................ 2013-140201

(51) Int. Cl.
*H04N 7/14*       (2006.01)
*H04N 7/15*       (2006.01)

(52) U.S. Cl.
CPC ................. *H04N 7/15* (2013.01); *H04N 7/147* (2013.01); *H04N 7/155* (2013.01)

(58) Field of Classification Search
None
See application file for complete search history.

(56) References Cited

U.S. PATENT DOCUMENTS

| 2002/0093531 | A1* | 7/2002  | Barile ........................... 345/753 |
| 2007/0200923 | A1* | 8/2007  | Eleftheriadis et al. ..... 348/14.08 |
| 2011/0090303 | A1* | 4/2011  | Wu et al. .................... 348/14.16 |
| 2011/0279630 | A1* | 11/2011 | Friel et al. .................. 348/14.08 |
| 2014/0098183 | A1* | 4/2014  | Smith et al. ................ 348/14.16 |

FOREIGN PATENT DOCUMENTS

JP    08-279999    10/1996
JP    2004-007284   1/2004

* cited by examiner

*Primary Examiner* — Maria El-Zoobi
(74) *Attorney, Agent, or Firm* — Oblon, McClelland, Maier & Neustadt, L.L.P.

(57) ABSTRACT

A video conference system comprising: a control device located at each of the at least two conference sites, the control device being connected to the video camera and the display device; and a server connected to the control device via a communication network, the control device comprising: a control terminal configured to control the display device; and an image display format selecting unit connected to the control terminal, wherein the image display format includes at least one format in which a predetermined process is performed to image data of the video image, the control device controls transmission and reception of the image data, and the display device located at a site displays the video image of another site with the selected image display format.

10 Claims, 23 Drawing Sheets

VIDEO CONFERENCE SYSTEM AND METHOD FOR PERFORMING THE SAME

CROSS-REFERENCE TO RELATED APPLICATIONS

The present application claims priority to and incorporates by reference the entire contents of Japanese Patent Application No. 2012-203698 filed in Japan on Sep. 14, 2012, Japanese Patent Application No. 2013-048503 filed in Japan on Mar. 11, 2013, and Japanese Patent Application No. 2013-140201 filed in Japan on Jul. 3, 2013.

BACKGROUND OF THE INVENTION

1. Field of the Invention

The present invention relates to a conference device installed in each of locations to conduct a video conference between the locations and a server that has a communication connection with the conference devices.

2. Description of the Related Art

In recent years, a video conference system has become widely used that enables a remote conference (video conference) by connecting terminal devices (conference devices) installed in remote places (locations) via a network such as the Internet. The conference devices are installed in conference rooms or the like in the respective locations and exchange images and voice of conferees with the other conference devices to conduct the video conference. Specifically, each of the conference devices captures images of the conferees participating in the video conference by a camera and collects voice of the conferees by a microphone, transmits the image data and the voice data to the other conference devices, receives image data and voice data from the other conference devices, displays a conference screen using the received image data on a display unit, and outputs the voice data, as audio, from a speaker.

Incidentally, if a general camera is used as the camera of the conference device, it may be difficult to capture an image of the entire conference room because the angle of view of the general camera is narrow. In particular, when a large number of conferees participate in the conference, in some cases, it may be difficult to capture all of the conferees within the field of view of the camera. To cope with this, there is a known technology to provide a wide-angle lens in the camera and perform image processing on a wide-angle image to zoom in or pan the scene of the conference (see Japanese Patent Application Laid-open No. H08-279999).

In the video conference system as described above, there is a demand by the conferees to conduct the video conference while viewing a desired conference screen according to the discussions in the conference or according to the progress of the conference. For example, there is a demand to conduct the conference while viewing the situation in the other conference rooms (situation of all of the conferees) or focusing on a specific conferee.

However, the technology disclosed in Japanese Patent Application Laid-open No. H08-27999 only enables to generate image data of the entire conference room or image data of an enlarged part of the conference room by performing image processing on the wide-angle image, but is unable to display a conference screen by using image data that the conferees want to view. Therefore, for example, even when the conferees want to view the situation of all of the conferees in the other locations, a conference screen with a close-up view of a specific conferee, such as a speaker, may be displayed. Namely, the conference screen desired by the conferee and the actual conference screen do not always match each other.

Therefore, there is a need for a conference device and a server capable of displaying a conference screen as desired by a conferee.

SUMMARY OF THE INVENTION

It is an object of the present invention to at least partially solve the problems in the conventional technology.

According to an aspect of the invention, a video conference system for holding a conference between at least two conference sites by displaying a video image that is captured with a video camera on a display device located at the conference site is provided. The video conference system includes: a control device located at each of the at least two conference sites, the control device being connected to the video camera and the display device; and a server connected to the control device via a communication network, the control device includes: a control terminal configured to control the display device; and an image display format selecting unit connected to the control terminal, wherein the image display format includes at least one format in which a predetermined process is performed to image data of the video image that is captured by the video camera, the control device controls transmission and reception of the image data, and the display device located at a site in which the image display format is selected by the image display format selection unit displays the video image of another site to which the selected image display format is noticed, with the selected image display format.

According to another aspect of the invention, a method for performing a video conference system for holding a conference between at least two conference sites by displaying a video image that is captured with a video camera on a display device located at the conference site is performed. The video conference system includes: a control device located at each of the at least two conference sites, the control device being connected to the video camera and the display device; and a server connected to the control device via a communication network, the control device includes: a control terminal configured to control the display device; and an image display format selecting unit connected to the control terminal, wherein the image display format includes at least one format in which a predetermined process is performed to image data of the video image that is captured by the video camera, the control device controls transmission and reception of the image data, the display device located at a site in which the image display format is selected by the image display format selection unit displays the video image of another site to which the selected image display format is noticed, with the selected image display format. The method includes: selecting a desired image display format, by the image display format selection unit located at the site in which the image display format is selected by the image display format selection unit; noticing the selected image display format to another control terminal located at the other site to which the selected image display format is noticed; performing on the image data a process according to the selected image display format; receiving from the server the image data with the selected image display format; and displaying the video image on the display device located at the site in which the image display format is selected by the image display format selection unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
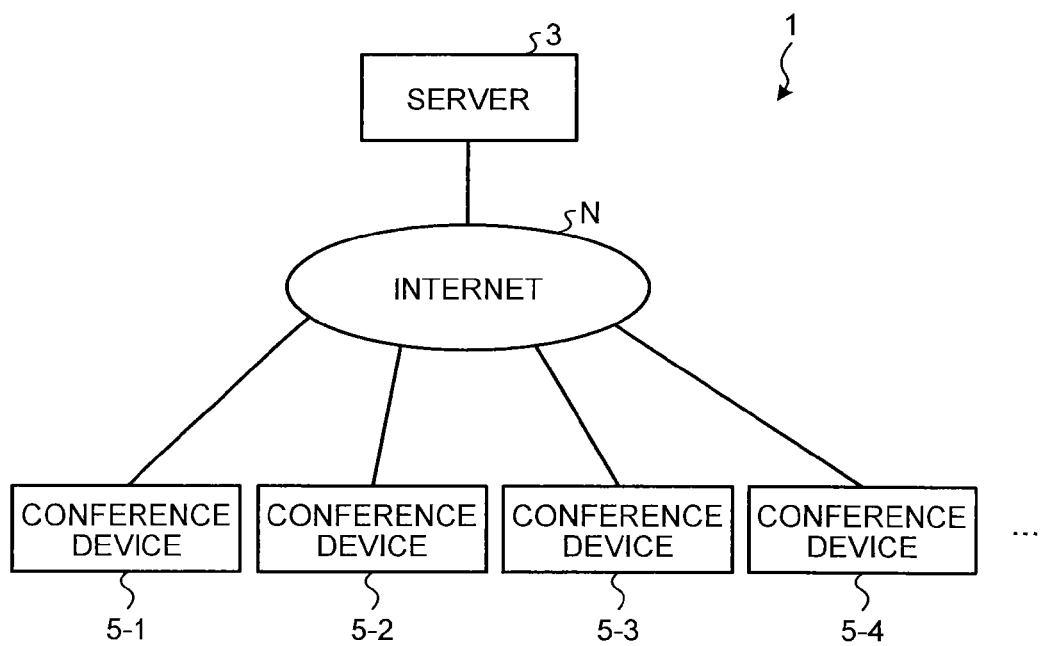
FIG. 1 is a block diagram illustrating an example of the entire configuration of a video conference system.

Exemplary embodiments of the present invention will be explained in detail below with reference to the accompanying drawings. The present invention is not limited to the embodiments below. In the drawings, same components are denoted by the same reference numerals and symbols.

First Embodiment

FIG. 1 is a block diagram illustrating an example of the entire configuration of a video conference system 1 according to a first embodiment. As illustrated in FIG. 1, the video conference system 1 includes a server 3 and a plurality of conference devices 5 (5-1, 5-2, 5-3, 5-4, . . . ), which are connected to one another via a network N, such as the Internet. As the server 3 and the conference devices 5, general-purpose computers, such as server computers, workstations, or personal computers, may be used.

The server 3 performs a process of monitoring whether a communication connection is established with each of the conference devices 5, a process of calling the conference devices 5 installed in locations (participating locations) participating in a video conference at the beginning of the conference, or a process of transferring, to other parties (other participating locations), image data or voice data that is transmitted by the conference devices 5 in the participating locations with which the communication connections have been established in response to a call during the video conference.

Each of the conference devices 5 is installed in a conference room or the like in a location in a remote place, and operated by a conferee of the video conference. During the video conference, the conference device 5 in each of the participating locations transmits image data of the conferee captured by a camera 51 (to be described later) and voice data of the conferee collected by a microphone 52 (to be described later) to the server 3, receives image data and voice data that are transmitted by the conference devices 5 in the other participating locations and that are transferred by the server 3, and outputs the received data by displaying the image data as a conference screen on a display unit 54 and outputting the voice data, as audio, from a speaker 55.

For example, when the three conference devices 5-1 to 5-3 of the video conference system 1 illustrated in FIG. 1 participate in a video conference, image data and voice data transmitted by the conference device 5-1 are transferred to the conference devices 5-2 and 5-3 serving as the other parties under the control of the server 3, but are not transferred to the conference device 5-4. Similarly, image data and voice data transmitted by each of the conference devices 5-2 and 5-3 are transferred to the conference devices 5-1 and 5-3 or to the conference devices 5-1 and 5-2 serving as the other parties under the control of the server 3, but are not transferred to the conference device 5-4. As described above, in the video conference system 1, a video conference is conducted between the participating locations where two or more conference devices 5 that have established the communication connections with the server 3 are installed. In the following, the conference device 5 in each of the participating locations participating in a single video conference through the communication connection established with the server 3 may be referred to as "the connected device 5" if needed.

Figure 2A:
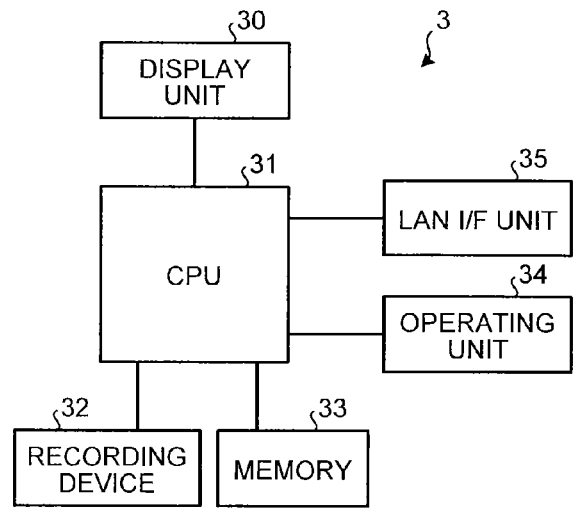
FIG. 2A is a block diagram illustrating a hardware configuration of a server according to a first embodiment.

FIG. 2A is a block diagram illustrating a hardware configuration of the server 3 according to the first embodiment. The server 3 according to the first embodiment includes a display unit 30, a central processing unit (CPU) 31, a recording device 32, a memory 33, an operating unit 34, and a local area network (LAN) interface (I/F) unit 35.

The display unit 30 includes, for example, a liquid crystal display (LCD), an electroluminescence (EL) display, or a cathode ray tube (CRT) display, and displays various types of information input by the CPU 31.

The recording device 32 includes, for example, a nonvolatile memory or a hard disk drive (HDD), and stores therein programs to be executed by the CPU 31 to control the units of the server 3 or to control transfer of captured images and voice when a video conference is conducted.

The memory 33 is used as a working memory of the CPU 31, and has a memory area for loading the programs executed by the CPU 31 and temporarily storing data or the like used by the CPU 31 during execution of the programs.

The operating unit 34 includes a keyboard, a mouse, a touch panel, various switches, or the like, and is used by a user (for example, an administrator of the server 3) to input operation. The operating unit 34 notifies the CPU 31 of the input operation.

The LAN I/F unit 35 is connected to an external device (for example, the conference device 5 installed in each location) via the network N, such as the Internet, and capable of transferring captured images and voice transmitted and received between the conference devices 5. In the first embodiment, the LAN I/F unit 35 may be a wired LAN connected to the Ethernet (registered trademark) compliant with 10 Base-T, 100 Base-TX, or 1000 Base-T, a wireless LAN compliant with 802.11a/b/g/n, or the like.

The CPU 31 is a control unit that controls transfer of the captured images and voice when controlling the units of the server 3 or when a video conference is conducted.

Figure 2B:
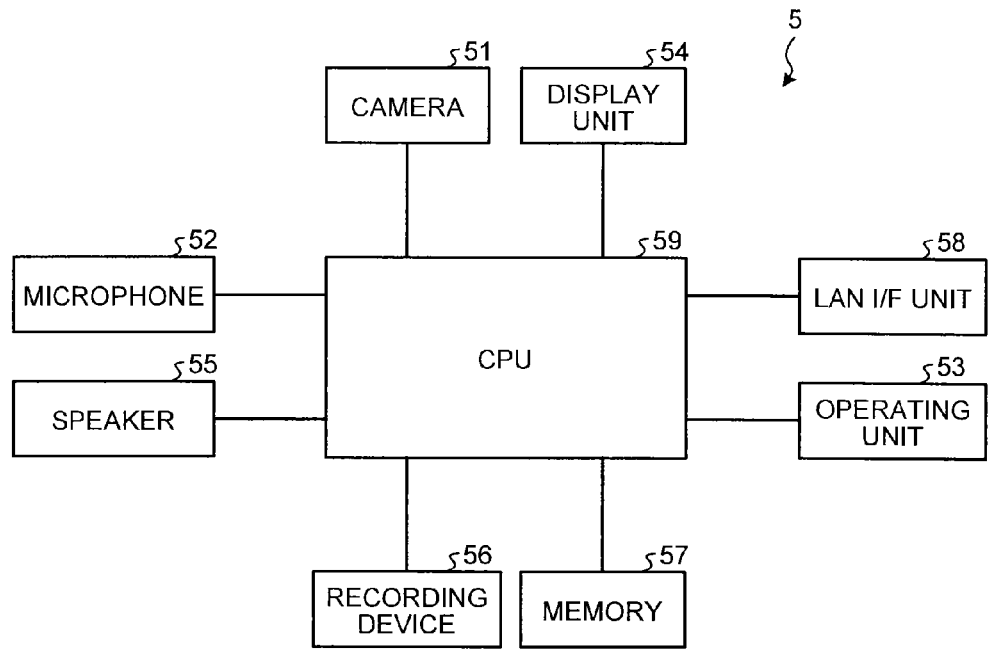
FIG. 2B is a block diagram illustrating a configuration example of main components inside a conference device.

FIG. 2B is a block diagram illustrating a configuration example of main components inside the conference device 5. As illustrated in FIG. 2B, the conference device 5 includes the camera 51, the microphone 52, an operating unit 53, the display unit 54, the speaker 55, a recording device 56, a memory 57, a LAN I/F unit 58, and a CPU 59 serving as a transmission format designating means, an image transmitting means, a reception format designating means, and an image display means.

The camera 51 is used to input an image of conferees and configured to continually capture an image of the situation inside a conference room and output generated image data to the CPU 59. The camera 51 includes a wide-angle lens and is installed, before a start of the video conference, at an appropriate position inside the conference room such that all of the conferees can be captured within the field of view (the angle of view). The microphone 52 is used to input voice of the conferees and configured to continually output collected voice data of the conferees to the CPU 59.

The operating unit 53 includes an input device, such as a keyboard, a mouse, a touch panel, or various switches, and outputs input data corresponding to input operation to the CPU 59.

The display unit 54 includes a display device, such as an LCD, an EL display, or a CRT display, and displays or outputs various screens, such as a conference screen for displaying image data (processed image data to be described later) input by the CPU 59. The speaker 55 outputs, as audio, voice data input by the CPU 59.

The recording device 56 is used to record programs for operating the conference device 5 to implement various functions of the conference device 5, data to be used during execution of the programs, or the like. The recording device 56 may be realized by an information recording medium, such as a flash memory capable of recording data and updating recorded data, a hard disk that is built-in or connected via a data communication terminal, or a memory card, and a read-write device of the information recording medium. Any recording device may be employed appropriately depending on the intended usage.

The memory 57 is used as a working memory of the CPU 59, and has a memory area for loading the programs executed by the CPU 59 and temporarily storing data or the like used during execution of the programs.

The LAN I/F unit 58 is used to perform data communication with an external device (for example, the server 3) and is connected to the network N via a LAN to transmit and receive image data and voice data to and from the other connected devices 5 via the server 3. Any device, such as a device (wired LAN) that performs control based on 10 Base-T, 100 Base-TX, or 1000 Base-T and connects to the Ethernet (registered trademark) or a device (wireless LAN) that performs control based on 802.11a/b/g/n, may be applied as the LAN I/F unit 58 depending on a connection mode.

The CPU 59 integrally controls the operation of the conference device 5 by giving instructions or transferring data to the units of the conference device 5 based on image data input from the camera 51, voice data input from the microphone 52, image data or voice data input from the other connected devices 5 via the LAN I/F unit 58, input data received from the operating unit 53, or programs and data recorded in the recording device 56. For example, after the CPU 59 has established a communication connection with the server 3 in response to a call from the server 3, the CPU 59 repeats a process of transmitting image data input by the camera 51 and voice data input by the microphone 52 to the server 3 and a process of receiving image data and voice data of the other connected devices 5 transferred by the server 3, in a parallel manner.

Specifically, the CPU 59 performs an image processing process (to be described later) on image data continually input from the camera 51 during the video conference. The CPU 59 outputs the image data (processed image data) subjected to the image processing process to the LAN I/F unit 58 together with the voice data continually input from the microphone 52, to thereby transmit the image data and the voice data to the server 3. The CPU 59 receives image data and voice data that are transmitted by the other connected devices 5 and that are transferred by the server 3 via the LAN I/F unit 58, in parallel with the above transmission process. The CPU 59 performs a process of continually outputting the received image data to the display unit 54 to display or output a conference screen and a process of continually outputting the received voice data to the speaker 55 to output audio, to thereby reproduce the images and voice input by the other connected devices 5. The image processing process need not be performed by the CPU 59 and may be performed by a dedicated image processing circuit.

The conference device (connected device) 5 of the first embodiment performs a predetermined image processing process on the image data input from the camera 51, and thereafter communicates with the other connected device 5. The image processing process is prepared as an image display format in which an individual image processing process is defined, and is recorded in the recording device 56 in advance. The image display format will be explained below. In the following, for simplicity of explanation, it is assumed that the two connected devices 5 have established communication connections with the server 3 and a video conference is conducted between the two participating locations.

The image display format indicates a method for modifying a part or the whole of the image data input from the camera 51 and defines the method by an image processing process. Specifically, the image display format serves as a rule for changing the view of an image.

Figure 3A:
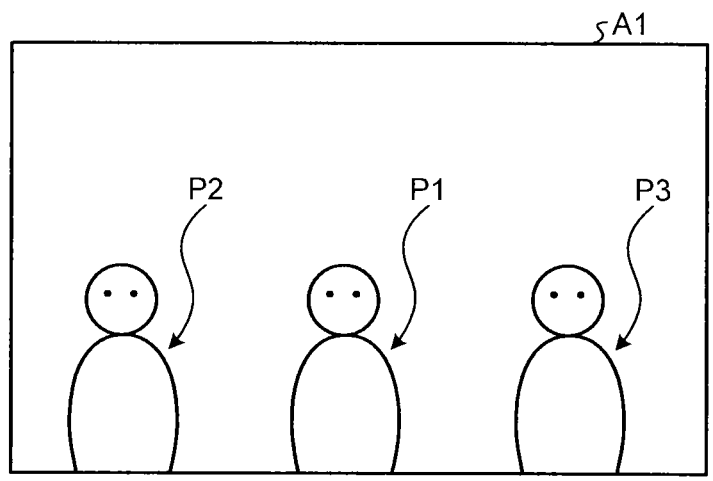
FIG. 3A is a diagram illustrating an example of a field of view of a camera during a video conference.
Figure 3B:
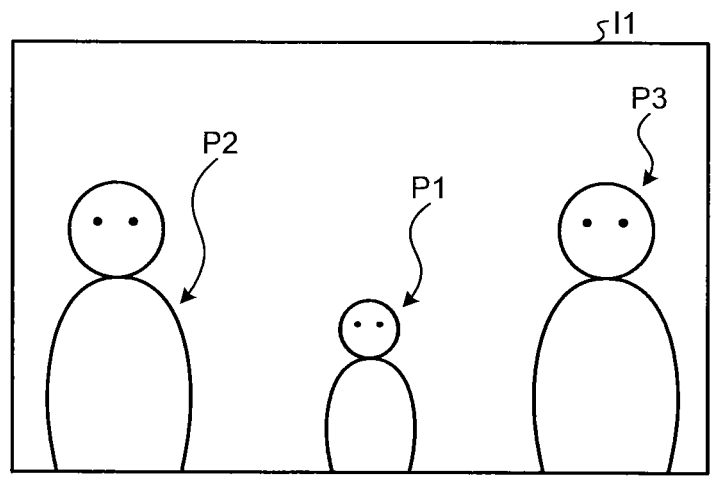
FIG. 3B is a diagram illustrating image data of the field of view illustrated in FIG. 3A.

FIG. 3A is a diagram illustrating an example of a field of view A1 of the camera 51 of the connected device 5 installed in one participating location of the video conference, where three conferees P1, P2, and P3 are sitting side by side in a conference room in the participating location. FIG. 3B is a diagram illustrating image data I1 obtained by capturing the field of view A1 illustrated in FIG. 3A by the camera 51. As described above, the camera 51 used in the video conference system 1 includes the wide-angle lens. Therefore, if the camera 51 captures the field of view A1, the image may be distorted due to the lens characteristics of the wide-angle lens. Consequently, while in actuality the conferees P1, P2, and P3 are sitting at positions with approximately the same distance from the camera 51 as illustrated in FIG. 3A, the conferee P1 in the center appears smaller while the conferees P2 and P3 on both sides appear greater in the generated image data as illustrated in FIG. 3B. Therefore, to conduct the video conference without uncomfortable feeling, it is necessary to perform a distortion correction process on the image data I1 generated by the camera 51 to correct image distortion in order to make the image closer to actual view as illustrated in FIG. 3A.

Figure 4:
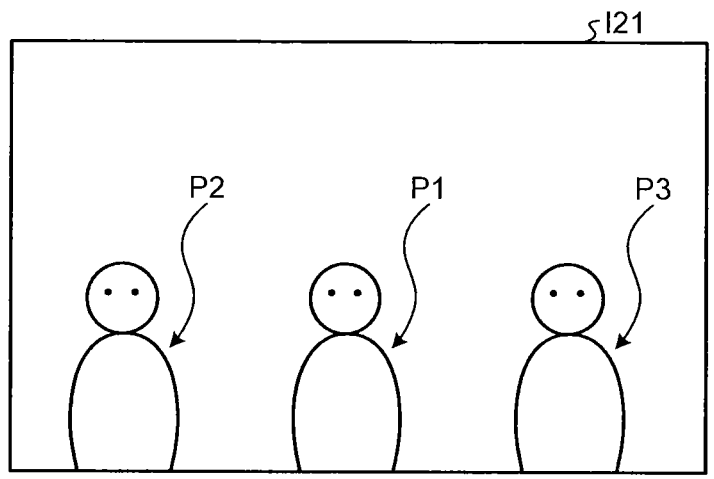
FIG. 4 is a diagram illustrating an example of overall image data.

Therefore, in the first embodiment, an image display format containing all of the conferees P1, P2, and P3 (hereinafter, the image display format is referred to as "an overall image") is prepared, and a distortion correction process for correcting image distortion is defined as the image processing process. FIG. 4 is a diagram illustrating an example of overall image data I21 obtained by performing the image processing process for the overall image. The image data I1 input from the camera 51 contains all of the conferees P1, P2, and P3 as illustrated in FIG. 3B. Therefore, if the distortion correction process is performed on the image data I1, the overall image data I21 (FIG. 4) containing the conferees in the participating location can be obtained as processed image data in which the image distortion due to the use of the wide-angle lens is corrected. With the overall image data I21, the image quality of the camera 51 using the wide-angle lens can be ensured. Therefore, conferees in the other participating location can conduct the video conference while viewing the conference screen that is closer to the actual view of the conference room (FIG. 3A) and that does not cause uncomfortable feeling compared with the image data I1 that is not subjected to the image processing process.

Figure 5:
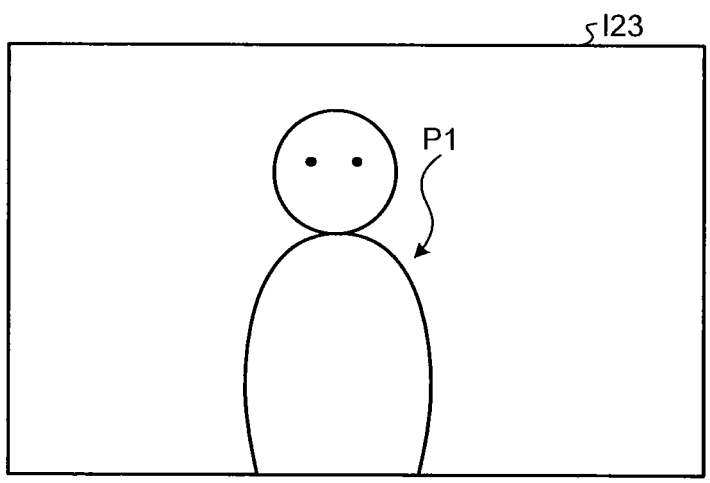
FIG. 5 is a diagram illustrating an example of partially-enlarged image data.

Meanwhile, in the video conference, in some cases, it may be desired to focus on a specific conferee, such as a conferee who is mainly making a statement. For example, if it is desired to focus on the conferee P1 in the center in FIG. 4 during the video conference, it may be difficult to recognize the facial expression of the conferee P1 in the overall image data I21 in FIG. 4 because he/she appears in a small size. Therefore, in the first embodiment, an image display format for focusing on the conferee P1 in the center (hereinafter, the image display format is referred to as "a partially-enlarged image") is prepared, and a process for extracting and enlarging an area of the conferee P1 is defined as the image processing process. FIG. 5 is a diagram illustrating an example of partially-enlarged image data I23 obtained by performing the image processing process for the partially-enlarged image. With use of the partially-enlarged image data, it becomes possible to conduct the video conference while viewing a conference screen with a close-up (zoom-in) view of the conferee P1, so that it becomes possible to solve the disadvantage that the speaker appears in a small size in the overall image data and to conduct the video conference smoothly. The present invention is not limited to the partially-enlarged image that focuses on the conferee P1 in the center. It may be possible to appropriately prepare an image display format that defines an image processing process for extracting and enlarging an area of the conferee P2 on the observer's left assuming that the conferee P2 mainly makes a statement, or an image display format that defines an image processing process for extracting and enlarging an area of the conferee P3 on the observer's right assuming that the conferee P3 mainly makes a statement.

Figure 6:
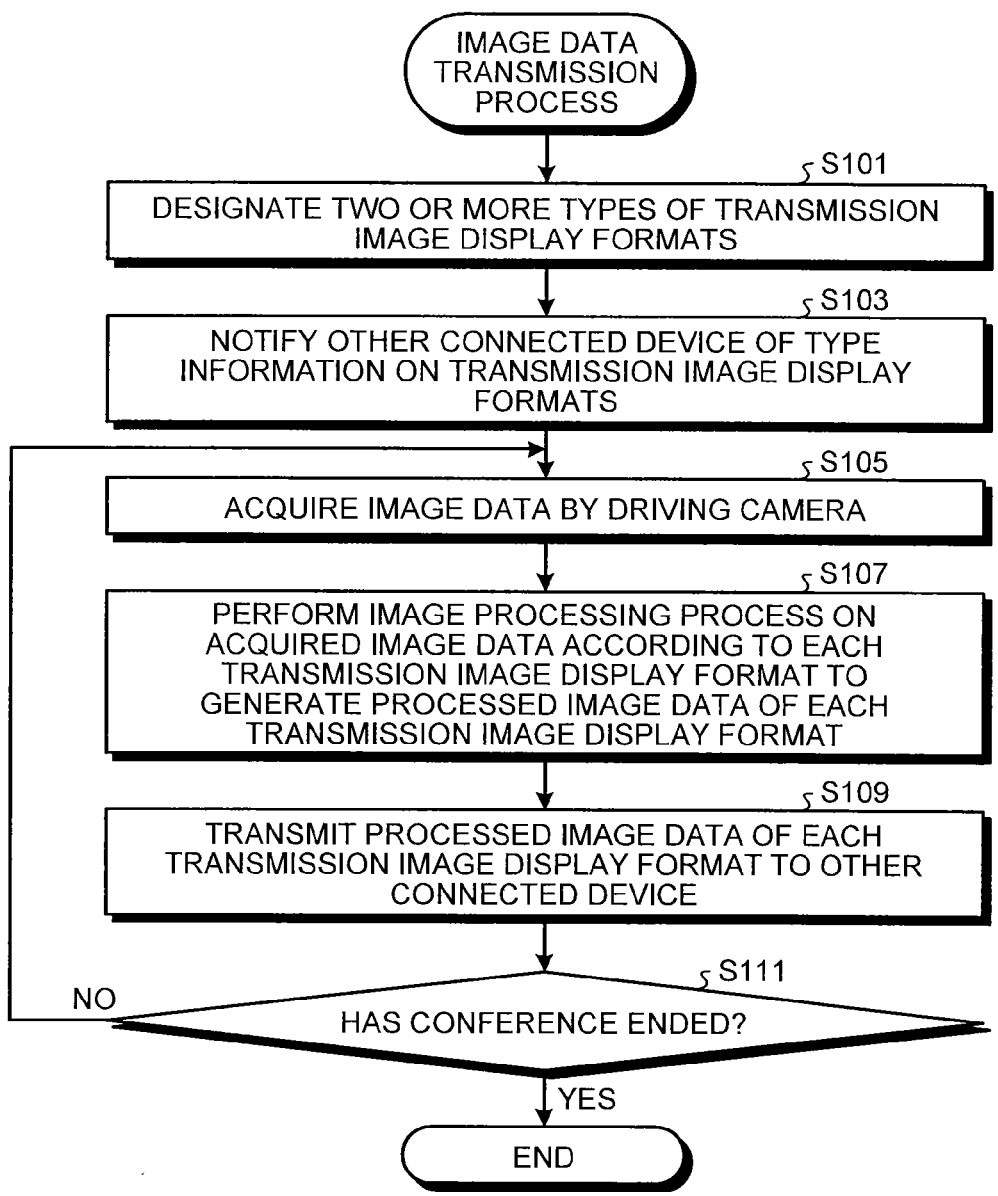
FIG. 6 is a flowchart illustrating the flow of an image data transmission process.
Figure 7:
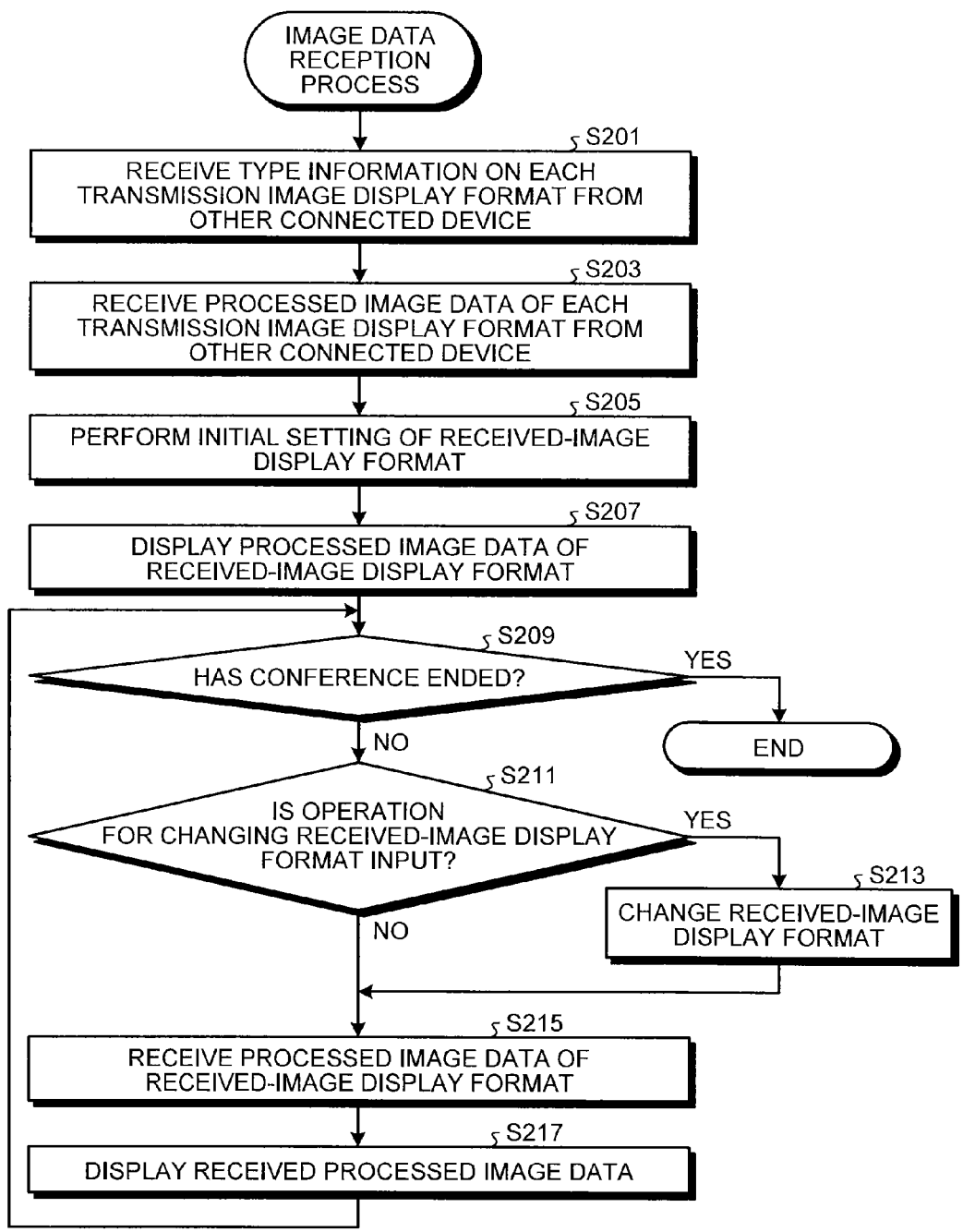
FIG. 7 is a flowchart illustrating the flow of an image data reception process.

The flow of a process for actually exchanging the processed image data between the connected devices 5 will be explained below. Each of the connected devices 5 serves as a transmission-side connected device 5 to repeat the process of transmitting the processed image data (an image data transmission process) as described above and also serves as a reception-side connected device 5 to repeat the process of receiving the processed image data (an image data reception process) as described above, in a parallel manner. FIG. 6 is a flowchart illustrating the flow of the image data transmission process, and FIG. 7 is a flowchart illustrating the flow of the image data reception process. Before a start of the image data transmission process and the image data reception process, communication connections between the server 3 and the conference devices 5 in the respective participating locations of a video conference are established and the video conference is started. During the video conference, voice data is also exchanged in addition to the processed image data.

In the image data transmission process, as illustrated in FIG. 6, the CPU 59 first designates two or more types of transmission image display formats used for transmission by the subject connected device 5 (Step S101). For example, the CPU 59 performs a process of displaying a list of transmittable image display formats on the display unit 54, and receives designation operation to designate two or more types of image display formats via the operating unit 53. The CPU 59 designates the two or more types of image display formats as the transmission image display formats according to the received designation operation.

Subsequently, the CPU 59 performs a process for notifying the other connected device 5 of pieces of type information on the transmission image display formats designated at Step S101 (Step S103). As an actual process, the CPU 59 performs a process of notifying the server 3 of the pieces of the type information on the transmission image display formats, and the server 3 performs a process of transferring the pieces of the type information to the other connected device 5.

The CPU 59 starts a process of capturing an image of a conferee by driving the camera 51 and acquires image data continually input from the camera 51 (Step S105). The CPU 59 generates the processed image data of each of the transmission image display formats by individually performing the image processing processes defined in the two or more types of transmission image display formats designated at Step S101 on the image data acquired at Step S105 (Step S107).

The CPU 59 performs a process for transmitting the processed image data of each of the transmission image display formats to the other connected device 5 (Step S109). As an actual process, the CPU 59 performs a process of transmitting the processed image data of each of the transmission image display formats to the server 3, and the server 3 performs a process of transferring the processed image data to the other connected device 5.

Thereafter, the CPU 59 determines whether the video conference has ended. If the video conference has not ended (NO at Step S111), the process returns to Step S105 and the above processes are repeated. If the video conference has ended (YES at Step S111), the image data transmission process is terminated.

For example, it is assumed that the conferee of the transmission-side connected device 5 designates two types of image display formats for the overall image and the partially-enlarged image as the transmission image display formats. In this case, the transmission-side connected device 5 notifies the connected device 5 on the receiving side (the other device) of the pieces of the type information indicating the overall image and the partially-enlarged image via the server 3 (Step S101 to Step S103). The transmission-side connected device 5 performs, as the image processing process, the distortion correction process on the image data acquired at Step S105 to generate the overall image data I21 as illustrated in FIG. 4, and separately performs, as the image processing process, a process of extracting and enlarging the area of the conferee P1 in the center in FIG. 3A on the image data acquired at Step S105 to generate the partially-enlarged image data I23 as illustrated in FIG. 5 (Step S107). Then, the transmission-side connected device 5 transmits the overall image data and the partially-enlarged image data to the server 3 (Step S109).

In contrast, in the image data reception process, as illustrated in FIG. 7, the CPU 59 first performs a process of receiving the pieces of the type information on the transmission image display formats that are transmitted by the other connected device 5 and that are transferred by the server 3 (Step S201), and performs a process of receiving the processed image data of each of the transmission image display formats transferred by the server 3 (Step S203).

Subsequently, the CPU 59 sets, as initial setting of a received-image display format (hereinafter, referred to as "an initial received-image display format"), an image display format to be used for the conference screen by the subject connected device 5 (Step S205), and performs a process of outputting the processed image data of the initial received-image display format to the display unit 54 in order to display the conference screen (Step S207). The initial setting of the received-image display format may be performed by, for example, automatically selecting one of the pieces of the type information received at Step S201 and setting the selected piece of the type information as an initial value of the received-image display format, or by receiving input of operation from the conferee. In the case of receiving the operation, the operation can be received through the same processes as those at Steps S211 and S213 described below. In this case, the CPU 59 performs a process of notifying the server 3 of the type information on the initial received-image display format. At Step S207, the CPU 59 displays the conference screen by using the processed image data of the initial received-image display format among the pieces of the processed image data of the respective transmission image display formats received at Step S203.

Subsequently, the CPU 59 determines whether the video conference has ended. If the video conference has not ended (NO at Step S209), the CPU 59 determines whether operation for changing the received-image display format is input. If the operation for changing the received-image display format is not input (NO at Step S211), the CPU 59 causes the process to proceed to Step S215.

In contrast, when the operation for changing the received-image display format is input (YES at Step S211), the CPU 59 changes the received-image display format (Step S213), and the process proceeds to Step S215. The process here is performed as described below for example. Specifically, the CPU 59 performs a process of displaying, on the display unit 54, a list of the two or more types of transmission image display formats designated by the other connected device 5 as image display formats available for the conference screen in accordance with the pieces of the type information received at Step S201. Then, the CPU 59 receives designation operation to designate one of the image display formats via the operating unit 53, and sets the one designated image display format as a changed received-image display format. In this case, the CPU 59 performs a process of notifying the server 3 of the type information on the changed received-image display format.

When three or more connected devices 5 are involved, it may be possible to receive the operation for changing the received-image display format for each of the other connected devices 5. The same processes are performed when the initial setting of the received-image display format is performed by receiving input of operation. With this configuration, when a video conference is conducted among three or more participating locations, it becomes possible to designate the overall image for a certain connected device 5 to enable to view all of the conferees in a corresponding participating location, and designate the partially-enlarged image for the other connected devices 5 to focus on a specific conferee (the conferee P1 in FIG. 3A) in corresponding participating locations.

At Step S215, the CPU 59 performs a process of receiving the processed image data in the received-image display format. As described above, the transmission-side connected device 5 designates the transmission image display formats that the transmission-side connected device 5 uses for transmission in the image data transmission process (Step S101 in FIG. 6), and transmits the processed image data of each of the designated transmission image display formats to the server 3 (Step S109 in FIG. 6). Furthermore, the reception-side connected device 5 notifies the server 3 of the type information on the received-image display format when the initial received-image display format is set at Step S205 and when the received-image display format is changed at Step S213. After receiving the notice of the initial setting or the notice of the change of the received-image display format, the server 3 transfers only the processed image data of the received-image display format among the pieces of the processed image data transmitted by the transmission-side connected device 5 to the reception-side connected device 5 as will be described later (Step S307 in FIG. 8). At Step S215 in FIG. 7, the CPU 59 receives the processed image data transferred by the server 3 as described above.

The CPU 59 performs a process of outputting the processed image data received at Step S215 to the display unit 54 to display the conference screen, so that the conference screen using the processed image data of the changed received-image display format is displayed (Step S217).

The CPU 59 returns the process to Step S209 and repeats the above processes until the video conference ends. If the video conference has ended (YES at Step S209), the image data reception process is terminated.

For example, if the transmission-side connected device 5 designates the two types of the display formats, i.e., the overall image and the partially-enlarged image, as the transmission image display formats, the reception-side connected device 5 selects one of the overall image data and the partially-enlarged image data to display the conference screen. Specifically, if the reception-side connected device 5 sets the overall image as the initial received-image display format, the reception-side connected device 5 notifies the server 3 of the type information on the overall image and receives the overall image data transferred by the server 3 as a reply (Steps S205 and S215). After the initial setting is performed, the video conference is conducted while viewing the conference screen showing all of the conferees P1, P2, and P3 illustrated in FIG. 3A.

Thereafter, if the conferee inputs operation for changing the received-image display format to the partially-enlarged image with respect to the reception-side connected device 5 at an arbitrary timing, the reception-side connected device 5 changes the received-image display format to the partially-enlarged image and notifies the server 3 of the type information on the partially-enlarged image (if YES at Step S211, then the process proceeds to S213). The reception-side connected device 5 receives the partially-enlarged image data transferred by the server 3 as a reply (Step S215). After the change operation is performed, the video conference is conducted while viewing the conference screen showing a close-up view of the conferee P1 in the center in FIG. 3A.

Figure 8:
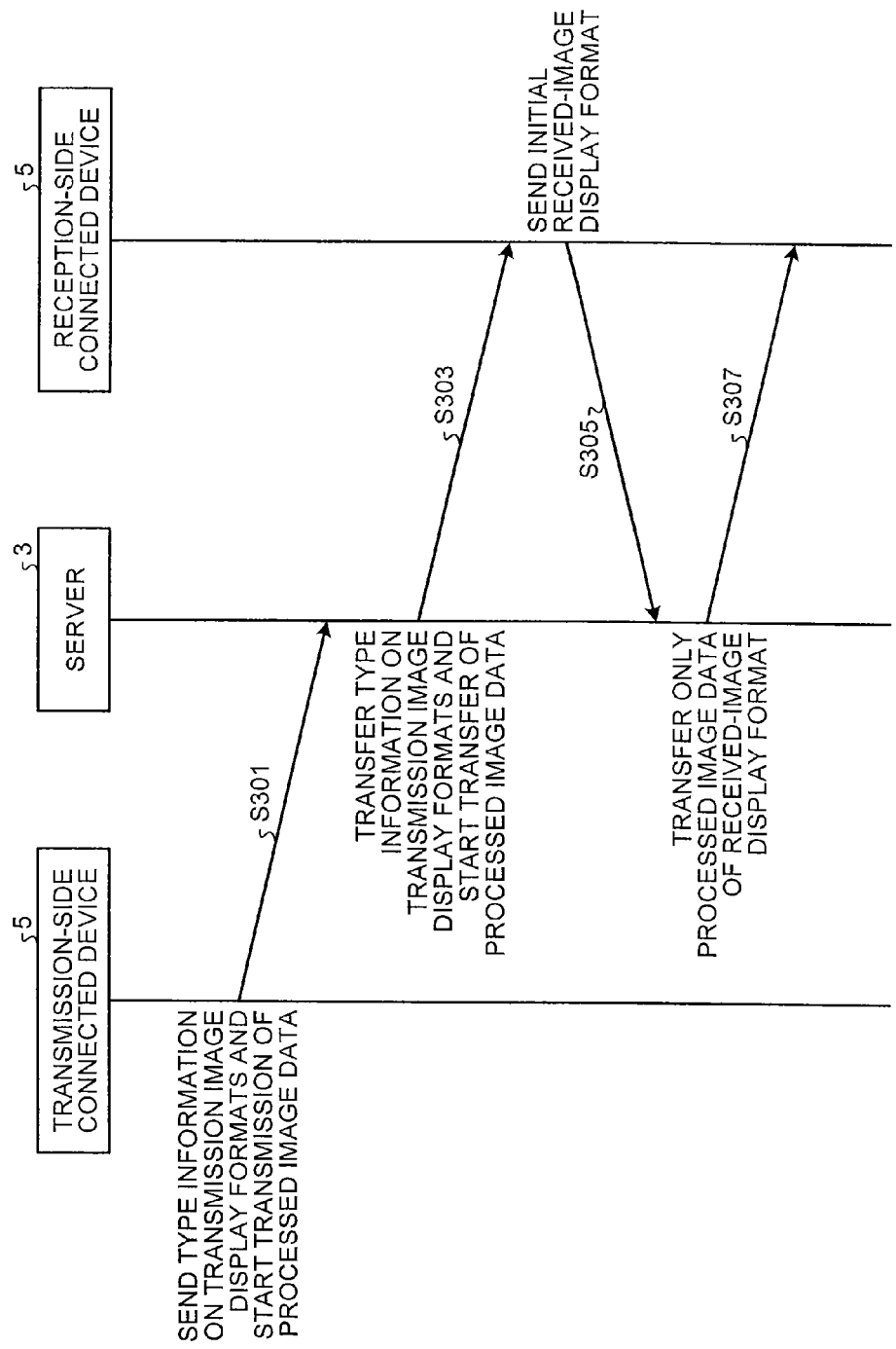
FIG. 8 is a diagram illustrating the flow of data transmitted and received between the server and the conference devices according to the first embodiment.
Figure 9:
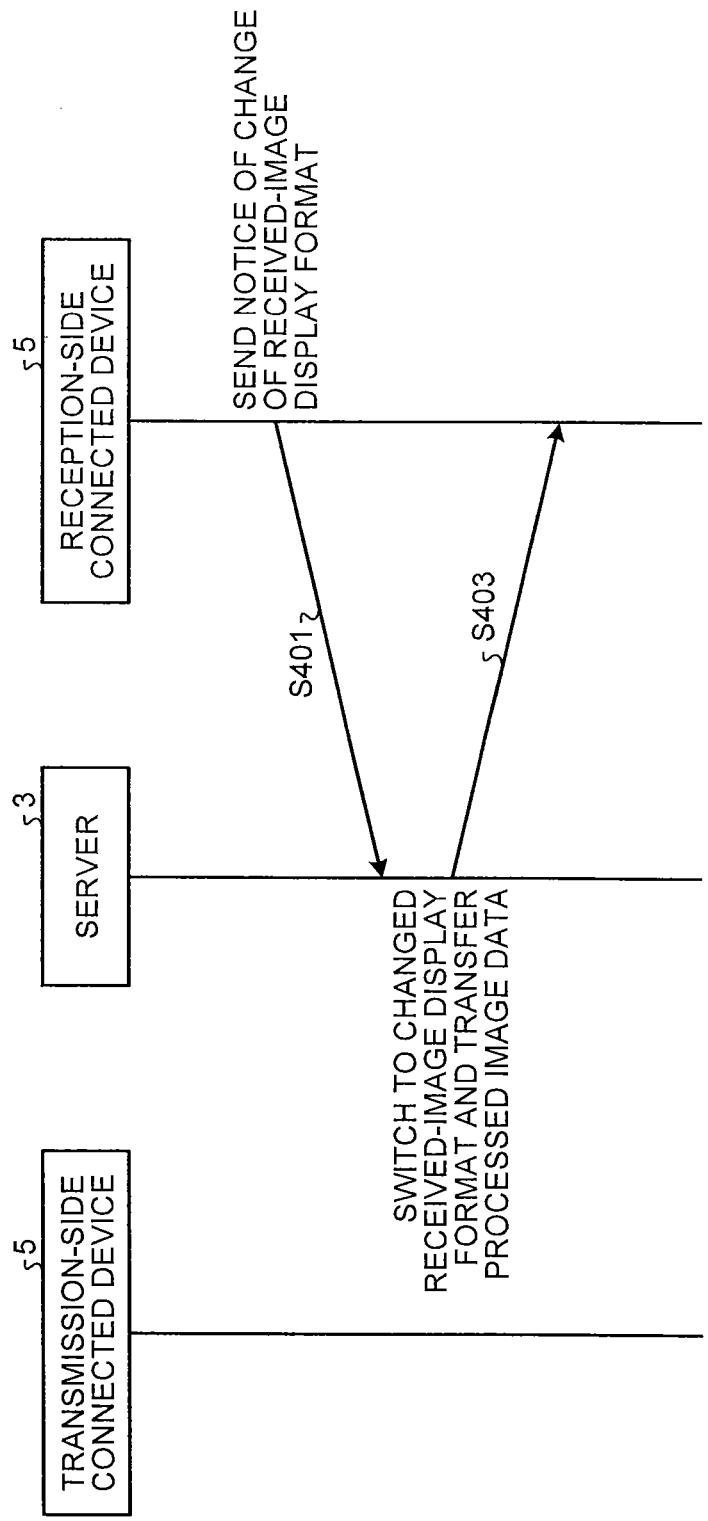
FIG. 9 is a diagram illustrating another flow of data transmitted and received between the server and the conference devices according to the first embodiment.

FIG. 8 is a diagram illustrating the flow of data transmitted and received between the server 3 and the connected devices (conference devices) 5. FIG. 9 is a diagram illustrating the flow of data transmitted and received between the server 3 and the connected devices (conference devices) 5 when the operation for changing the received-image display format is input to the reception-side connected device 5. The processed image data is exchanged between the connected devices 5 by causing the server 3 to intervene between the connected devices 5 that repeat the image data transmission process and the image data reception process in a parallel manner. FIG. 8 and FIG. 9 illustrate the data flow in the case where the processed image data is transmitted from the transmission-side connected device 5 to the reception-side connected device 5 on the assumption that one of the connected devices 5 serves as a transmission side and the other one of the connected devices 5 serves as a reception side. However, in actuality, the reception-side connected device 5 also serves as the transmission side and the transmission-side connected device 5 also serves as the reception side, so that the same processes are performed in parallel in the reverse direction.

As illustrated in FIG. 8, the transmission-side connected device 5 notifies the server 3 of the pieces of the type information on the transmission image display formats and starts transmission of the pieces of the processed image data (Step S301). The process at this step corresponds to the processes from Steps S103 to S109 in FIG. 6. In response to the above process, the server 3 transfers the pieces of the type information on the transmission image display formats to the reception-side connected device 5 and starts transferring the processed image data of each of the transmission image display formats to the reception-side connected device 5 (Step S303).

In contrast, when receiving the pieces of the type information on the transmission image display formats transferred by the server 3, the reception-side connected device 5 sets the initial received-image display format and notifies the server 3 of the type information on the initial received-image display format (Step S305). The process at this step corresponds to the process at Step S205 in FIG. 7. After receiving the notice of the initial setting of the received-image display format from the reception-side connected device 5 as described above, the server 3 transfers, to the reception-side connected device 5, only processed image data of the received-image display format among the pieces of the processed image data continually transmitted by the transmission-side connected device 5 (Step S307). In actuality, to enable the process, the server 3 manages a list of the transmission image display formats designated by each of the connected devices 5 and a list of the received-image display formats designated by each of the connected devices 5. The server 3 refers to the lists to perform a process of selectively transferring, to the reception-side connected device 5, the processed image data of each of the two or more types of transmission image display formats transmitted by the transmission-side connected device 5.

Furthermore, as illustrated in FIG. 9, when the operation for changing the received-image display format is performed, the reception-side connected device 5 notifies the server 3 of the type information on the changed received-image display format (Step S401). The process at this step corresponds to the process at Step S213 in FIG. 7. When receiving the notice of the change of the received-image display format from the reception-side connected device 5 as described above, the server 3 switches to the changed received-image display format and transfers the processed image data of the changed received-image display format to the reception-side connected device 5 (Step S403). In this case, the server 3 updates the list of the received-image display formats as described above.

As described above, according to the first embodiment, the conference device (connected device) 5 can prepare the image display formats, in each of which the image processing process is individually defined in advance, and can designate, as the transmission image display formats, two or more types of image display formats that the connected device 5 uses for transmission. When transmitting the image data to the other connected device 5, the connected device 5 can individually perform the image processing process defined in the transmission image display formats to generate the processed image data of each of the transmission image display formats. The processed image data of each of the image display formats generated as above can be transmitted to the other connected device 5 via the server 3. In contrast, when receiving the image data from the transmission-side connected device 5, the conference device (connected device) 5 can change the received-image display format by setting, as the initial received-image display format, one of the image display formats that are designated as the transmission image display formats by the other connected device 5, or by receiving input of operation from the conferee. Then, the conference screen using the processed image data of the received-image display format can be displayed. Therefore, it is possible to display the conference screen as desired by the conferee.

In particular, in the first embodiment, it is possible to acquire image data containing all of the conferees at any time by using the camera 51 including the wide-angle lens. It is also possible to, for example, perform the distortion correction process on the acquired image data to generate the overall image data according to the image display format (the overall image) that defines the image processing process for correcting image distortion, generate the partially-enlarged image data according to the image display format (the partially-enlarged image) that defines the image processing process of extracting and enlarging an area of a specific conferee (the conferee P1 in the center in FIG. 3A) on the image data, and transmit the pieces of the image data to the other connected device 5 via the server 3. The reception-side connected device 5 can select and use one of the overall image data and the partially-enlarged image data to display the conference screen.

Furthermore, the server 3 can receive the processed image data of each of the transmission image display formats from the transmission-side connected device 5 and transfer the processed image data to the reception-side connected device 5. Because the server 3 receives the processed image data of each of the transmission image display formats from the transmission-side connected device 5 as described above, after receiving the notice of the initial setting or the notice of the change of the received-image display format from the reception-side connected device 5, the server 3 can transfer only the processed image data of the designated received-image display format to the reception-side connected device 5. Therefore, it becomes possible to transfer only the processed image data to be displayed on the conference screen by each of the connected devices 5 to each of the connected devices 5, so that the network bandwidth used for data communication between the server 3 and the connected devices 5 can be reduced. Therefore, even when a line with lower network bandwidth capability is used, it is possible to stably perform data communication.

In the first embodiment, a case is explained that the two connected devices 5 are used. However, the same can apply when three or more connected devices 5 are connected to the server 3 to conduct a video conference among the three or more participating locations. Specifically, the server 3 performs a process of selectively transferring the processed image data of each of the transmission image display formats transmitted by the transmission-side connected device 5 to each of the reception-side connected devices 5 by referring to a list of the transmission image display formats or the received-image display formats that are managed and updated as described above for each of the connected devices 5.

First Modification

In the first embodiment described above, it is explained that the transmission-side connected device 5 transmits the processed image data of each of the transmission image display formats to the server 3, and the server 3 transfers only the processed image data of the received-image display format designated by the reception-side connected device 5 to the reception-side connected device 5. In contrast, the transmission-side connected device 5 may transmit only the processed image data of the received-image display format designated by the reception-side connected device 5.

Figure 10:
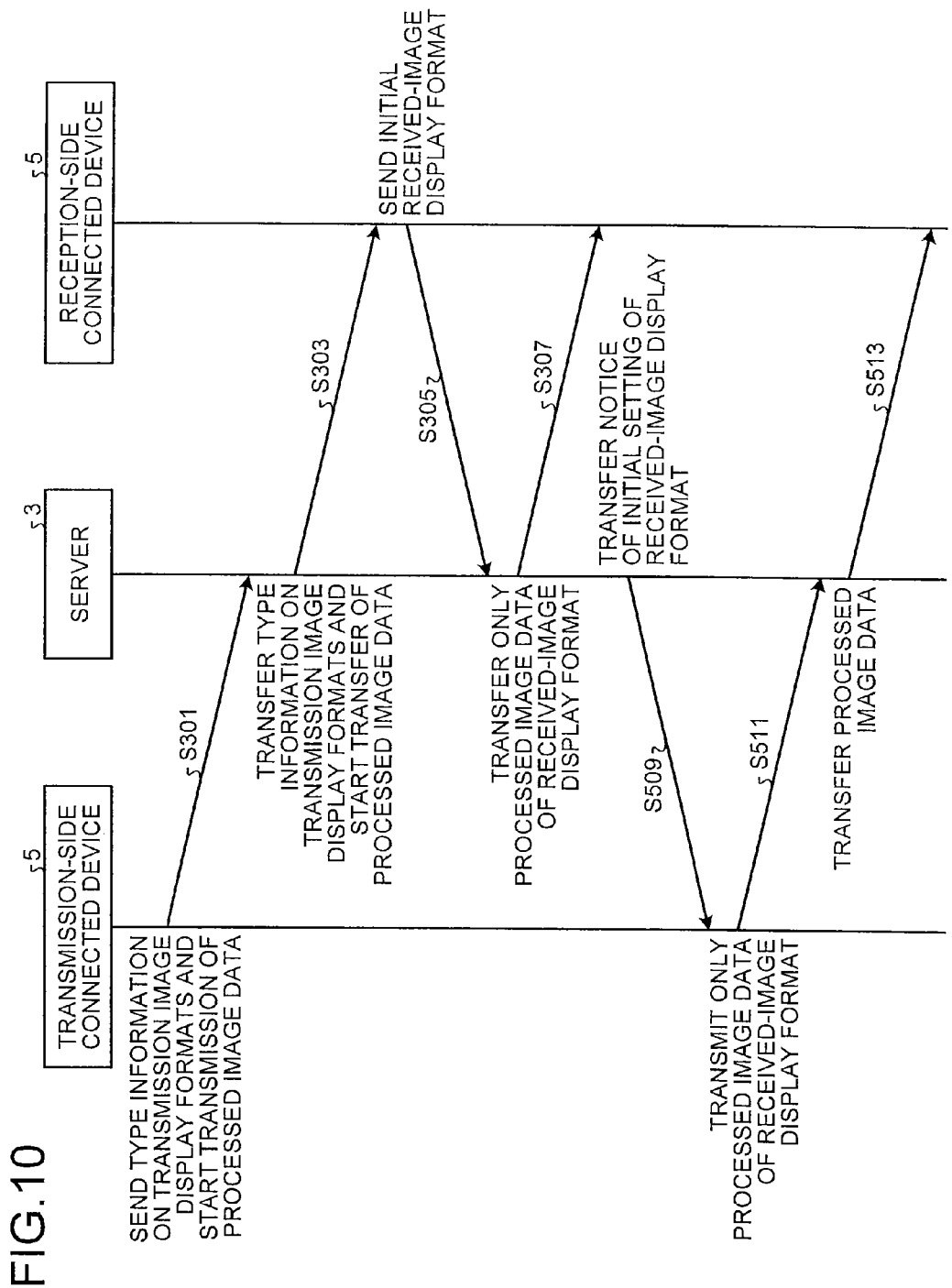
FIG. 10 is a diagram illustrating the flow of data transmitted and received between the server and the conference devices according to a first modification.
Figure 11:
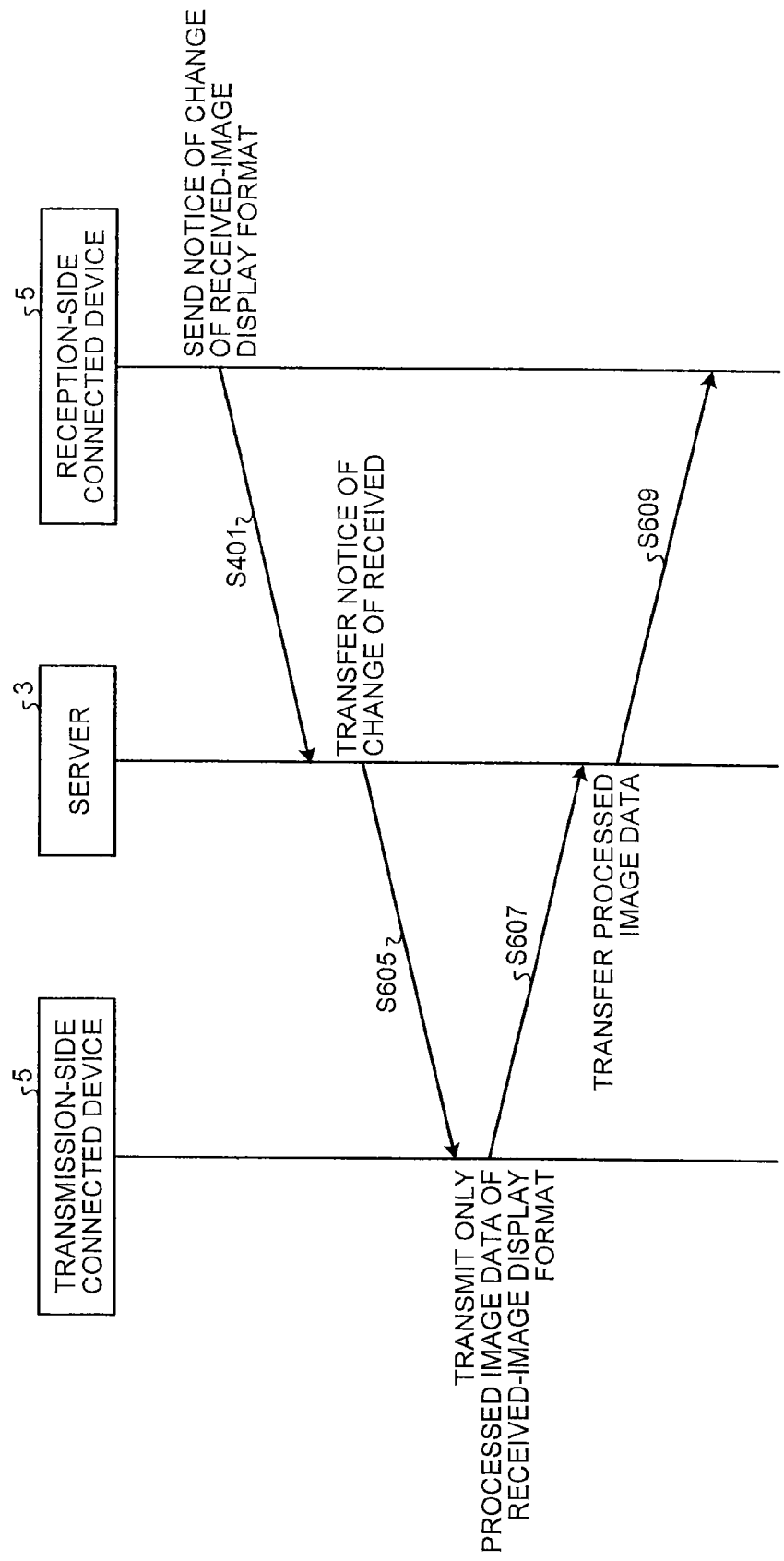
FIG. 11 is a diagram illustrating another flow of data transmitted and received between the server and the conference devices according to the first modification.

FIG. 10 is a diagram illustrating the flow of data transmitted and received between the server 3 and the connected devices (conference devices) 5 according to a first modification. FIG. 11 is a diagram illustrating the flow of data transmitted and received between the server 3 and the connected devices (conference devices) 5 when the operation for changing the received-image display format is input to the reception-side connected device 5. In FIG. 10 and FIG. 11, the same processes as those described in the first embodiment are denoted by the same reference numerals and symbols, and explanation thereof will be omitted.

As illustrated in FIG. 10, when receiving the notice of the initial setting of the received-image display format from the reception-side connected device 5, the server 3 transfers only the processed image data of the received-image display format to the reception-side connected device 5 similarly to the first embodiment as described above (Step S307). However, in the first modification, the received notice of the initial setting (the type information on the received-image display format) is subsequently transferred to the transmission-side connected device 5 (Step S509). In response to the above process, the transmission-side connected device 5 transmits only the processed image data of the notified received-image display format to the server 3 (Step S511). In this case, the transmission-side connected device 5 only needs to generate the processed image data of the received-image display format. The server 3 transfers the processed image data transmitted by the transmission-side connected device 5 to the reception-side connected device 5 (Step S513).

Furthermore, as illustrated in FIG. 11, when receiving the notice of the change of the received-image display format from the reception-side connected device 5, the server 3 transfers the received notice of the change (the type information on the received-image display format) to the transmission-side connected device 5 (Step S605). In response to the above process, the transmission-side connected device 5 transmits only the processed image data of the notified received-image display format to the server 3 (Step S607). In this case, similarly to Step S511 in FIG. 10, the transmission-side connected device 5 only needs to generate the processed image data of the received-image display format. The server 3 transfers the processed image data transmitted by the transmission-side connected device 5 to the reception-side connected device 5 (Step S609).

In the first modification, after the reception-side connected device 5 sets the initial received-image display format, the transmission-side connected device 5 transmits only the processed image data of the received-image display format designated by the reception-side connected device 5 (Step S511 in FIG. 10 and Step S607 in FIG. 11). Therefore, when the received-image display format is changed, the transmission-side connected device 5 needs to change the image display format of the processed image data to be transmitted.

Furthermore, when three or more connected devices 5 have communication connections to the server 3 to conduct a video conference, in some cases, the transmission-side connected device 5 may need to add the processed image data to be transmitted. For example, when the four connected devices 5-1 to 5-4 illustrated in FIG. 1 have communication connections to the server 3 to conduct a video conference, and if the connected devices 5-1 to 5-3 designate the overall image with respect to the connected device 5-4, the connected device 5-4 generates only the overall image data and transmits the overall image to the server 3. In this state, if the connected device 5-1 changes the received-image display format with respect to the connected device 5-4 to the partially-enlarged image, the connected device 5-4 needs to newly generate the partially-enlarged image data in addition to the overall image data and transmit the partially-enlarged image data to the server 3. In contrast, when the connected devices 5-1 and 5-2 designate the overall image with respect to the connected device 5-4 and the connected device 5-3 designates the partially-enlarged image with respect to the connected device 5-4, the connected device 5-4 generates the overall image data and the partially-enlarged image data and transmits the pieces of the image data to the server 3. In this state, if the connected device 5-1 changes the received-image display format with respect to the connected device 5-4 to the partially-enlarged image, the connected device 5-4 does not need to generate new processed image data. This is because, because the connected device 5-4 has already generated the partially-enlarged image data for the connected device 5-3 and transmitted the partially-enlarged image data to the server 3, it is sufficient to cause the server 3 to transfer the partially-enlarged image data to the connected device 5-1.

Figure 12:
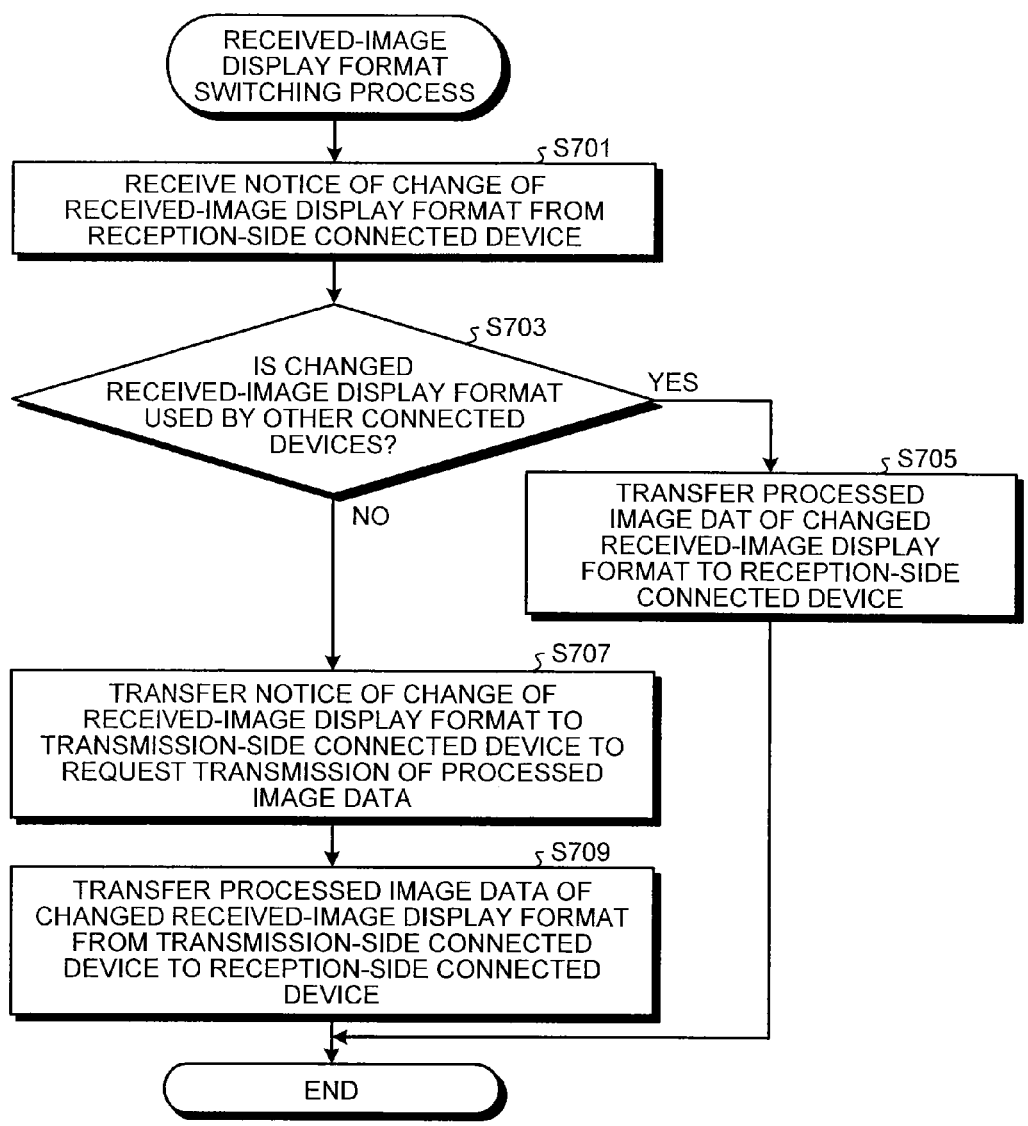
FIG. 12 is a flowchart illustrating the flow of a received-image display format switching process.

FIG. 12 is a flowchart illustrating the flow of a received-image display format switching process performed by the server 3 when the server 3 receives the notice of the change of the received-image display format from the reception-side connected device 5 in the first modification.

In the received-image display format switching process, as illustrated in FIG. 12, the server 3 receives, from the reception-side connected device 5, the notice of the change of the received-image display format designated for the transmission-side connected device 5 (Step S701). When receiving the notice of the change, the server 3 determines whether the changed received-image display format is designated by the other connected devices 5. Similarly to the first embodiment as described above, the server 3 manages the lists of the transmission image display formats and the received-image display formats of each of the connected devices 5, and performs the determination by referring to the lists. If the changed received-image display format is designated by the other connected devices 5 (YES at Step S703), the server 3 transfers the processed image data of the changed received-image display format to the reception-side connected device 5 (Step S705).

In contrast, if the changed received-image display format is not designated by the other connected devices 5 (NO at Step S703), the server 3 transfers the notice of the change of the received-image display format to the transmission-side connected device 5 to request transmission of the processed image data (Step S707). In response to the above process, the transmission-side connected device 5 generates new processed image data of the changed received-image display format and transmits the generated processed image data to the server 3. The server 3 transfers the processed image data of the changed received-image display format transmitted by the transmission-side connected device 5 as described above to the reception-side connected device 5 (Step S709).

In the first modification, the CPU 59 of the connected device 5 determines whether the notice of the initial setting and the notice of the change are transferred by the server 3 after Step S105 in FIG. 6, and, after the notices are transferred, the CPU 59 performs a process of generating only the processed image data of the received-image display format designated by the other connected device 5 and transmitting the generated processed image data to the server 3 instead of the processes at Step S107 and S109. Furthermore, the CPU 59 of the connected device 5 performs the image data reception process in the same manner as in FIG. 7.

As described above, according to the first modification, it is possible to achieve the same advantageous effects as those of the first embodiment. Furthermore, after the initial setting of the received-image display format is performed, each of the connected devices 5 can generate only the processed image data of the received-image display format designated by the other connected devices 5 from among the transmission image display formats designated by each of the connected devices 5, and transmit the generated processed image data to the server 3. Therefore, it becomes possible to reduce the usage rate of the CPU 59 of each of the connected devices 5. If the image processing process is performed by a dedicated image processing circuit, it is possible to reduce the usage rate of the image processing circuit. As a result, it is possible to reduce power consumption of each of the connected devices 5.

Second Modification

In the first embodiment described above, the image processing process is performed by the connected device 5. However, the image processing process need not be performed by the connected device 5 and may be performed by the server 3.

Figure 13:
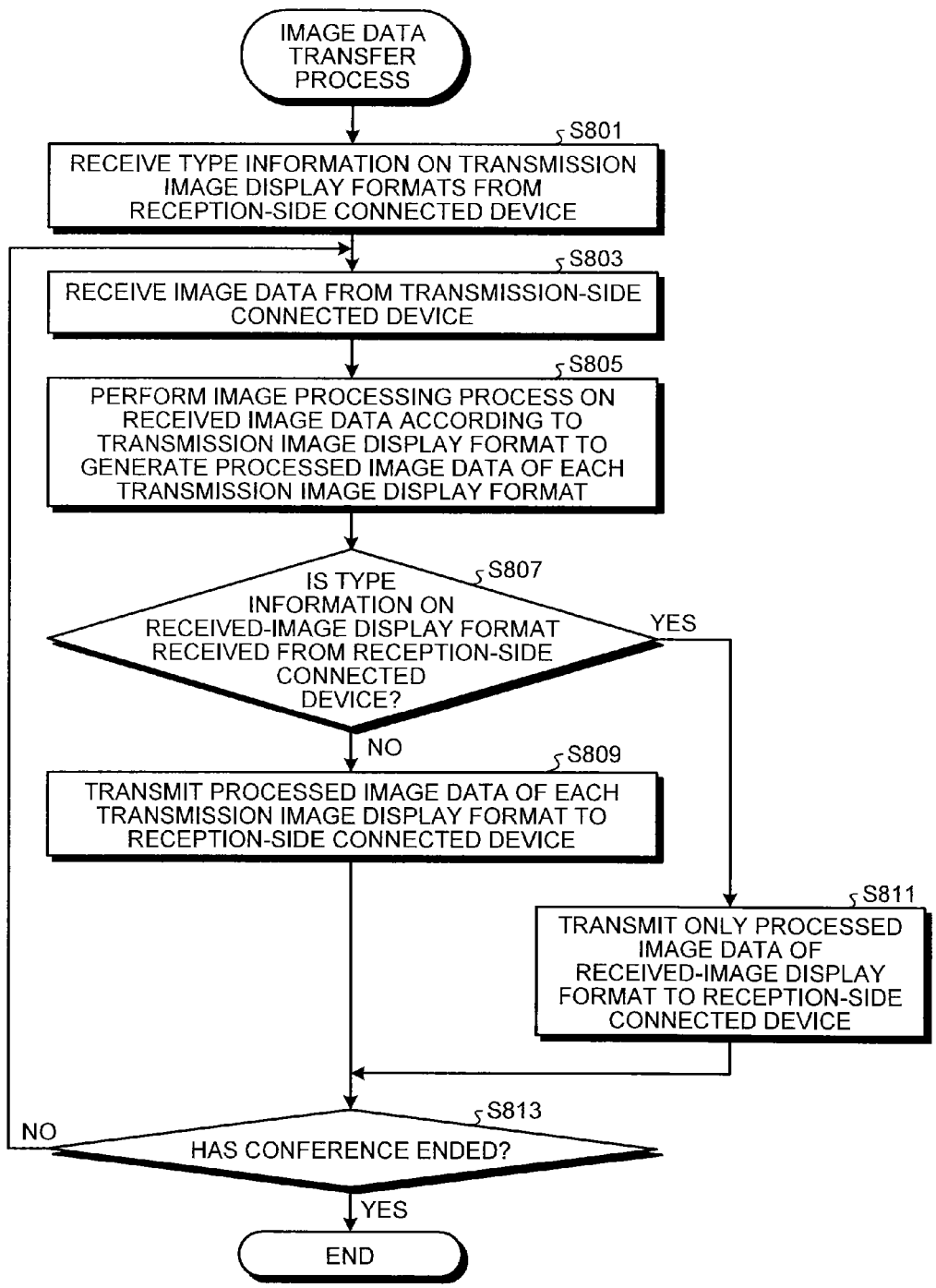
FIG. 13 is a flowchart illustrating the flow of an image data transfer process.

FIG. 13 is a flowchart illustrating the flow of an image data transfer process performed by the server 3 according to a second modification. Before a start of the image data transmission process and the image data reception process, communication connections between the server 3 and the conference devices 5 in the respective participating locations of a video conference are established and the video conference is started. In the second modification, the image display format that defines the image processing process is prepared on the server 3 side.

In the image data transfer process, as illustrated in FIG. 13, the server 3 first receives pieces of the type information on two or more types of transmission image display formats transmitted by the reception-side connected device 5 (Step S801), and receives image data transmitted by the transmission-side connected device 5 (Step S803).

The server 3 individually performs the image processing process defined in the two or more types of transmission image display formats received at Step S801 on the image data received at Step S803 to thereby generate the processed image data of each of the transmission image display formats (Step S805).

The server 3 determines whether the type information on the received-image display format is received from the reception-side connected device 5, that is, whether a notice of initial setting or a notice of a change of the received-image display format are received. While the type information on the received-image display format is not received from the reception-side connected device 5 (NO at Step S807), the server 3 transmits the processed image data of each of the transmission image display formats generated at Step S805 to the reception-side connected device 5 (Step S809). In contrast, when receiving the type information on the received-image display format from the reception-side connected device 5 (YES at Step S807), the server 3 transmits only the processed image data of the received-image display format among the pieces of the processed image data of the respective transmission image display formats generated at Step S805 to the reception-side connected device 5 (Step S811). Meanwhile, after receiving the type information on the received-image display format from the other connected devices 5, each of the connected devices 5 may generate only the processed image data of the received-image display format designated by the other connected devices 5.

Thereafter, the server 3 determines whether the video conference has ended. If the video conference has not ended (NO at Step S813), the process returns to Step S803 and the above processes are repeated. If the video conference has ended (YES at Step S813), the image data transfer process is terminated.

In the second modification, the CPU 59 of the connected device 5 does not perform the process at Step S107 in the image data transmission process in FIG. 6, and performs a process of transmitting the image data acquired at Step S105 to the server 3 instead of the process at Step S109. Furthermore, the CPU 59 of the connected device 5 performs the image data reception process in the same manner as in FIG. 7.

As described above, according to the second modification, it is possible to achieve the same advantageous effects as those of the first embodiment. Furthermore, after the initial setting of the received-image display format is performed, the server 3 can generate only necessary processed image data according to the received-image display format designated by each of the connected devices 5, and transmit the processed image data to each of the connected devices 5.

Third Modification

Figure 14:
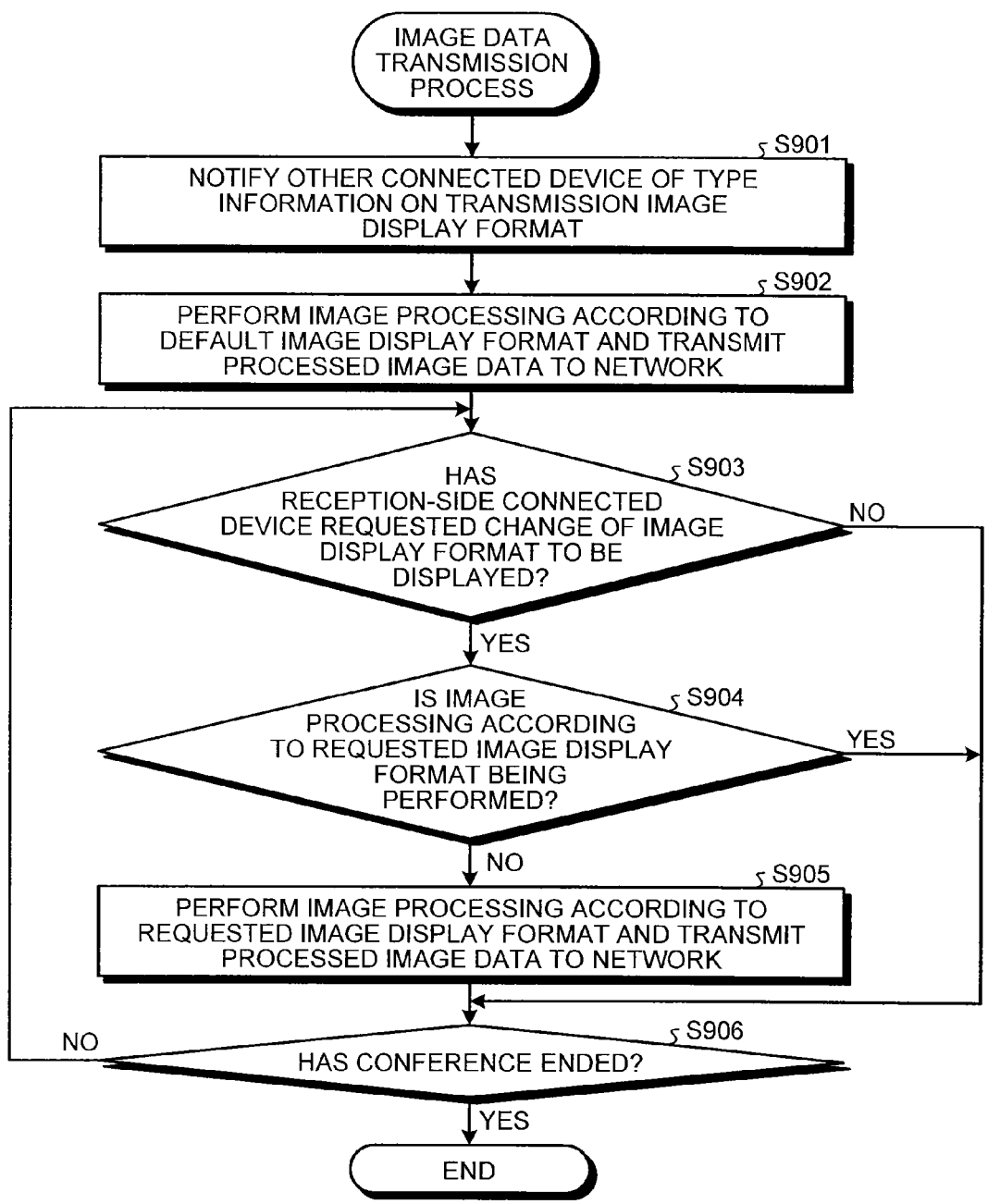
FIG. 14 is a flowchart illustrating the flow of an image data transmission process according to a third modification.

In the first embodiment, the image processing is performed on all of the image display formats immediately after the conference is started. In a third modification, an example will be explained in which the image processing is performed on a single image display format immediately after the conference is started. FIG. 14 is a flowchart illustrating the flow of an image data transmission process according to the third modification. FIG. 14 illustrates the flow of the image processing performed on the image display format by the transmission-side connected device 5 performs after a request for an image display format desired to be displayed is received from the reception-side connected device 5.

The CPU 59 of the transmission-side connected device 5 notifies the other connected device 5 of the type information on the image display format to be transmitted (the transmission image display format) (Step S901). The CPU 59 performs image processing according to a default image display format and transmits the processed image data to the network (Step S902). The default image display format is an arbitrary one of image display formats that can be transmitted by the transmission-side connected device 5. For example, information on which format serves as the default image display format is recorded in advance in the recording device of the transmission-side connected device 5.

The CPU 59 determines whether the reception-side connected device 5 has requested a change of the image display format to be displayed (Step S903). When the change has been requested (YES at Step S903), the CPU 59 determines whether the image processing according to the requested image display format is being performed (Step S904).

If the image processing according to the requested image display format is not being performed (NO at Step S904), the CPU 59 performs the image processing according to the newly-requested image display format in addition to the image processing according to the default image display format, and transmits the processed image data to the network (Step S905).

Thereafter (NO at Step S903, YES at Step S904, or after completion of Step S905), the CPU 59 determines whether the video conference has ended (Step S906). If the video conference has not ended (NO at Step S906), the process returns to Step S903 and the above processes are repeated. If the video conference has ended (YES at Step S906), the image data transmission process is terminated.

In the example in FIG. 14, the image processing is added upon reception of the request for the change of the image display format from the reception-side connected device 5. In contrast, when there is an image display format that is not displayed by any of the reception-side connected devices 5, the transmission-side connected device 5 may cancel the image processing according to the image display format and cancel the transmission via the network.

Through the processes as illustrated in FIG. 14, the transmission-side connected device 5 need not transmit multiple image display formats to the network immediately after the conference is started. Furthermore, the transmission-side connected device 5 need not perform the image processing according to the image display format that is not displayed by the reception-side connected device 5.

Figure 15:
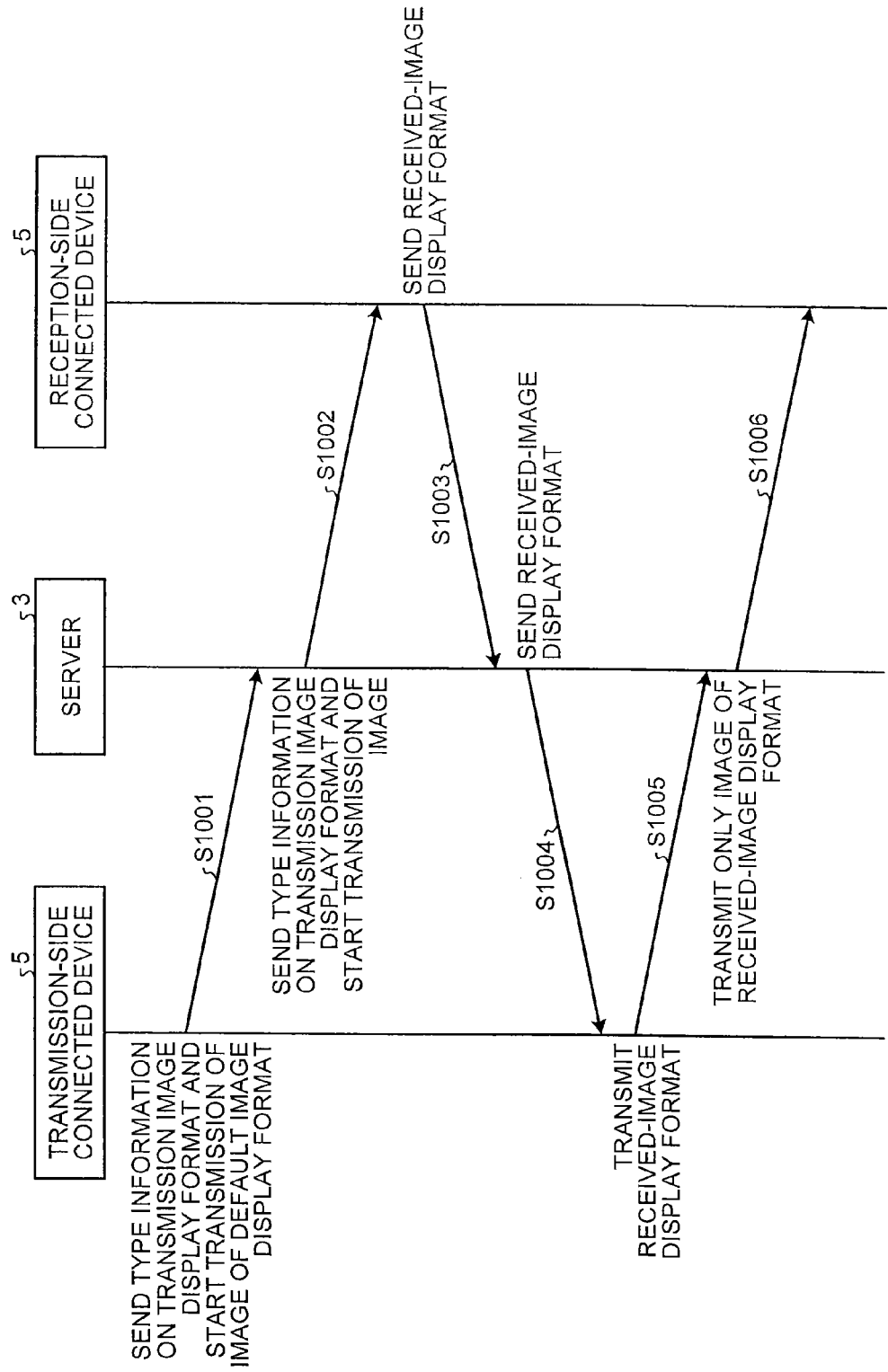
FIG. 15 is a diagram illustrating the flow of data transmitted and received between the server and the conference devices according to the third modification.

FIG. 15 is a diagram illustrating the flow of data transmitted and received between the server and the conference devices according to the third modification.

When the conference is started, the transmission-side connected device 5 notifies the server 3 of the type information on the transmission image display format and starts transmitting an image of the default image display format (Step S1001). The server 3 transfers the notice of the type information on the image display format and the processed image data received from the transmission-side connected device 5 to each of the reception-side connected devices 5 (Step S1002).

When switching to another image display format that differs from the current image display format, the reception-side connected device 5 notifies the server 3 of an image display format desired to be displayed (received-image display format) (Step S1003). The server 3 notifies the transmission-side connected device 5 of the image display format requested by the reception-side connected device 5 (Step S1004).

When receiving the notice, the transmission-side connected device 5 transmits the requested image display format to the server 3 (Step S1005). The server 3 transmits only an image of the image display format requested by the reception-side connected device 5 to the reception-side connected device 5 (Step S1006).

In some cases, the transmission-side connected device 5 has already transmitted a corresponding image display format to the server 3 when the reception-side connected device sends a request for a change of the image display format to be displayed. In this case, the server 3 may transmit the corresponding image display format that has been already received to the reception-side connected device 5 that has sent the request, without notifying the transmission-side connected device 5 of the change request. For example, this may occur when a conference is conducted among multiple locations.

Fourth Modification

In general, the load of the CPU 59 of the connected device 5 greatly increases due to image processing, so that it is difficult to simultaneously perform a plurality of types of image processing by a single connected device 5. Therefore, it may be possible to set, in advance before shipment, the number (a predetermined number) of types of image processing that can simultaneously be performed by a single connected device 5, and if it is necessary to perform a greater number of types of image processing than the predetermined number, the server 3 may be used. With this configuration, it becomes possible to perform a plurality of types of image processing.

Figure 16:
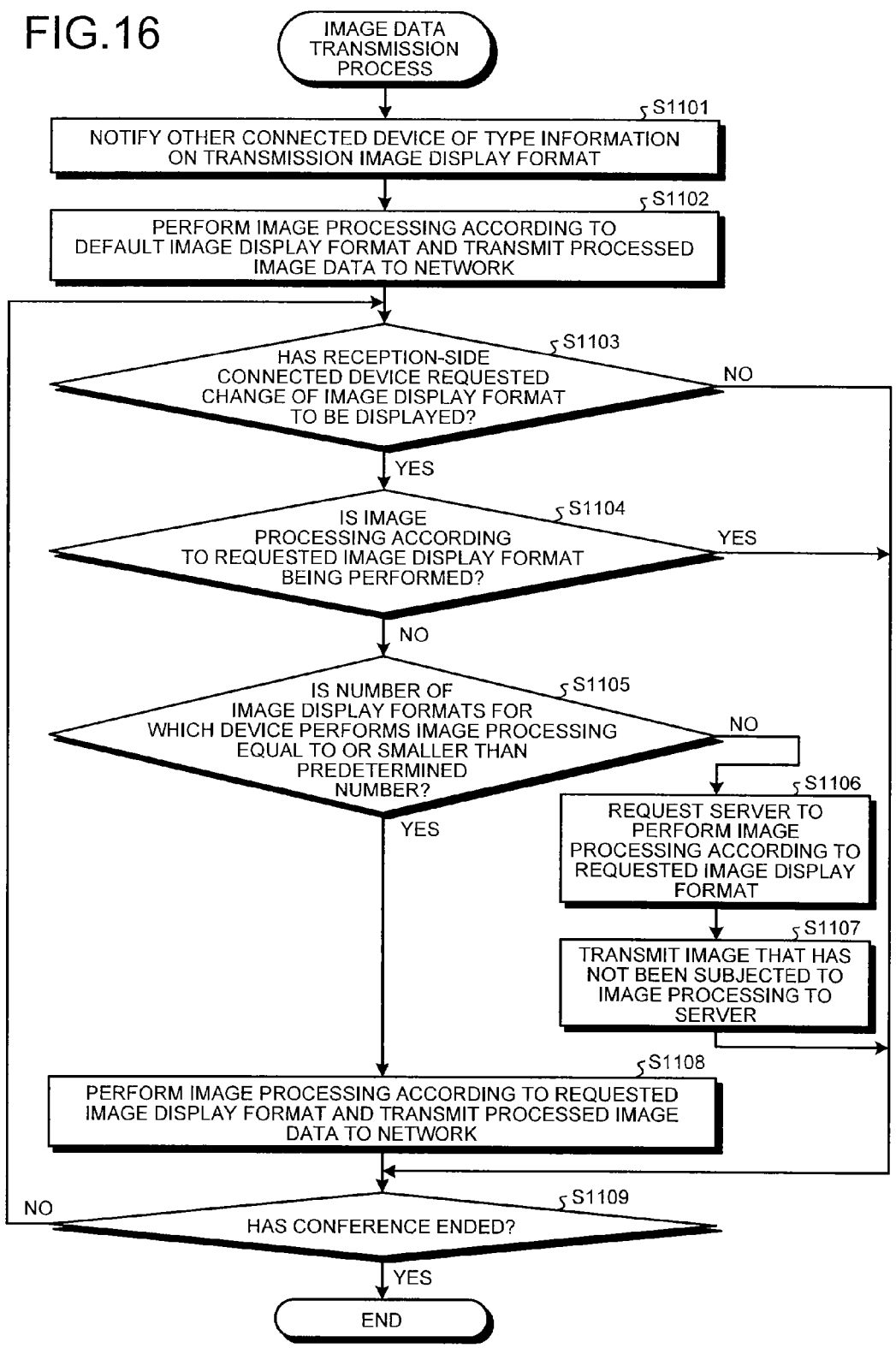
FIG. 16 is a flowchart illustrating the flow of an image data transmission process according to a fourth modification.

FIG. 16 is a flowchart illustrating the flow of an image data transmission process according to a fourth modification configured as described above.

The processes from Step S1101 to Step S1104 are the same as those from Step S901 to Step S904 in FIG. 14; therefore, the same explanation will not be repeated.

At Step S1104, if the image processing according to the requested image display format is not performed (NO at Step S1104), the CPU 59 determines whether the number obtained by adding one that corresponds to the number of a new image display format to the number of the image display formats that are currently subjected to the image processing by the transmission-side connected device 5 is equal to or smaller than the predetermined number (Step S1105). If the number is equal to or smaller than the predetermined number (YES at Step S1105), the CPU 59 performs the image processing according to the requested image display format in addition to the current image processing, and transmits the processed image data to the network (Step S1108). It is assumed that the predetermined number is stored in, for example, the storage device of the transmission-side connected device 5 in advance.

If the number is greater than the predetermined number (NO at Step S1105), the CPU 59 requests the server 3 to perform the image processing according to the requested image display format (Step S1106). The CPU 59 transmits an original image that is to be subjected to the image processing by the server 3, that is, an image that has not been subjected to the image processing, to the server 3 (Step S1107).

Thereafter (NO at Step S1103, YES at Step S1104, after completion of Step S1107, or after completion of Step S1108), the CPU 59 determines whether the video conference has ended (Step S1109). If the video conference has not ended (NO at Step S1109), the process returns to Step S1103 and repeats the above processes. If the video conference has ended (YES at Step S1109), the image data transmission process is terminated.

Figure 17:
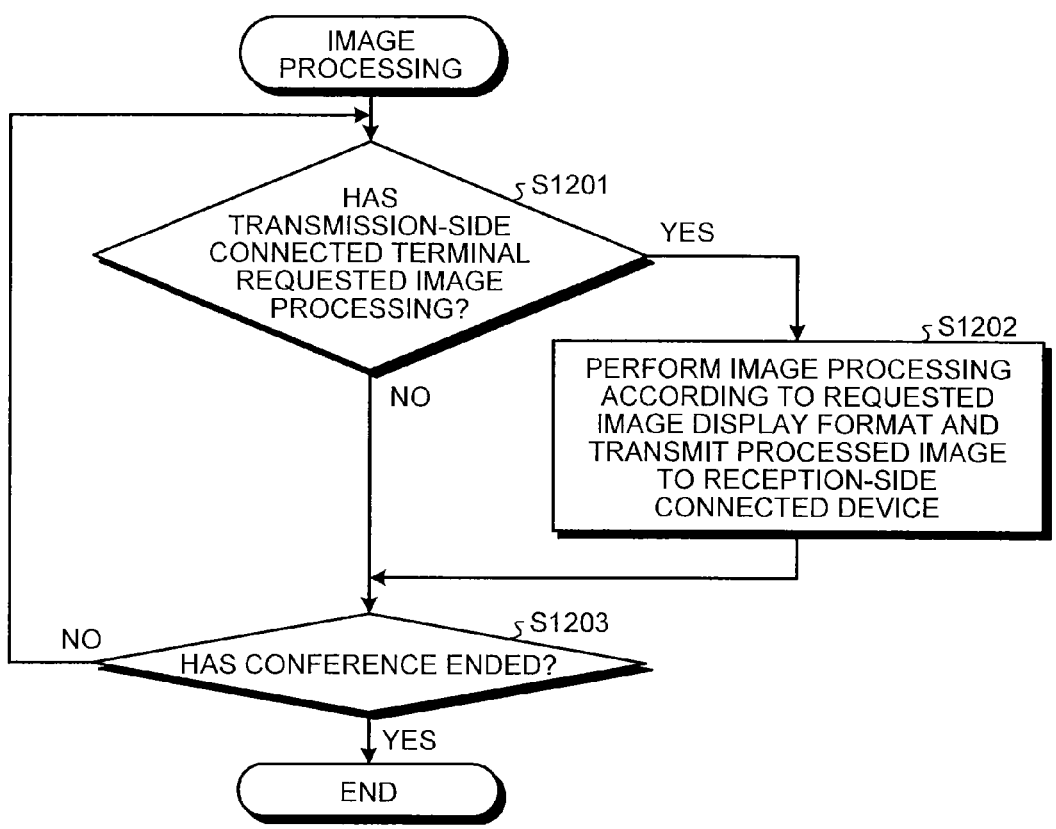
FIG. 17 is a flowchart illustrating the flow of image processing performed by a server according to the fourth modification.

FIG. 17 is a flowchart illustrating the flow of the image processing performed by the server 3 according to the fourth modification.

When the conference is started, the server 3 determines whether the transmission-side connected device 5 has requested the image processing (Step S1201). If the image processing has been requested (YES at Step S1201), the server 3 performs the image processing by using an original image received from the transmission-side connected device 5 and transmits the processed image to the reception-side connected device 5 (Step S1202).

Thereafter (NO at Step S1201 or after completion of Step S1202), the server 3 determines whether the video conference has ended (Step S1203). If the video conference has not ended (NO at Step S1203), the process returns to Step S1201 and the above processes are repeated. If the video conference has ended (YES at Step S1203), the image processing is terminated.

Figure 18:
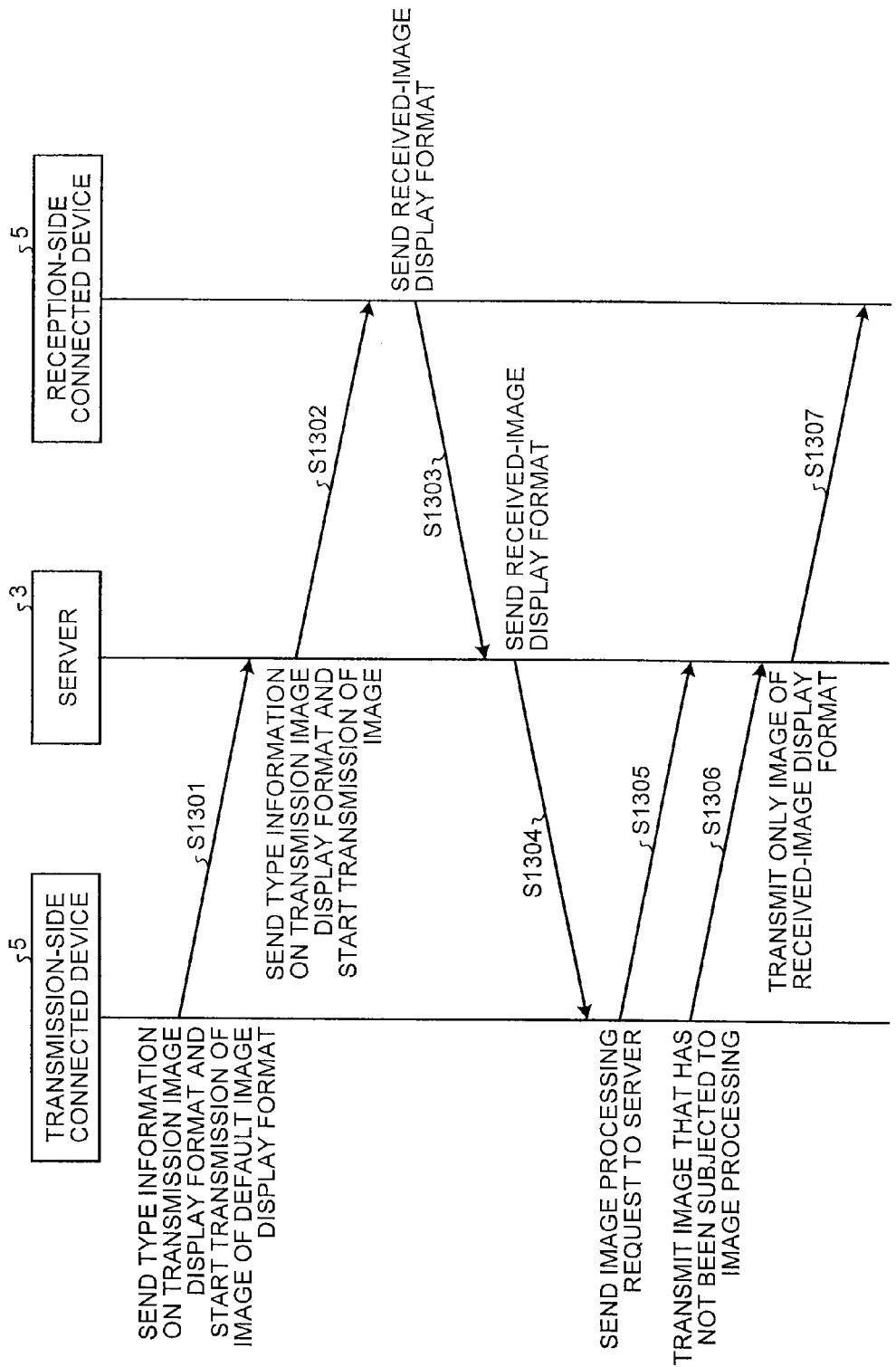
FIG. 18 is a diagram illustrating the flow of data transmitted and received between the server and the conference devices according to the fourth modification.

FIG. 18 is a diagram illustrating the flow of data transmitted and received between the server and the conference devices according to the fourth modification.

When the conference is started, the transmission-side connected device 5 notifies the server 3 of the type information on the transmission image display format and starts transmitting an image of the default image display format (Step S1301). The server 3 notifies the reception-side connected device 5 of the type information on the transmission image display format received from the transmission-side connected device 5 and transmits the processed image data to the reception-side connected device 5 (Step S1302).

When changing the desired image display format to be displayed, the reception-side connected device 5 notifies the server 3 of the image display format (received-image display format) (Step S1303). The server 3 transmits the request for the change of the image display format received from the reception-side connected device 5 to the transmission-side connected device 5 (Step S1304).

If the transmission-side connected device 5 is not able to perform the image processing according to the requested image display format, the transmission-side connected device 5 notifies the server 3 of the request for the image processing (Step S1305). Subsequently, the transmission-side connected device 5 transmits an image that has not been subjected to the image processing to the server 3 (Step S1306).

The server 3 performs the image processing according to the image display format requested by the reception-side connected device 5 at Step S1303 on the received image, and transmits the image subjected to the image processing to the reception-side connected device 5 (Step S1307).

Second Embodiment

A configuration of a display control system according to a second embodiment is the same as the configuration illustrated in FIG. 1; therefore, explanation thereof will be omitted. Furthermore, the internal configuration of a conference device according to the second embodiment is the same as the configuration illustrated in FIG. 2B; therefore, explanation thereof will be omitted.

Figure 19:
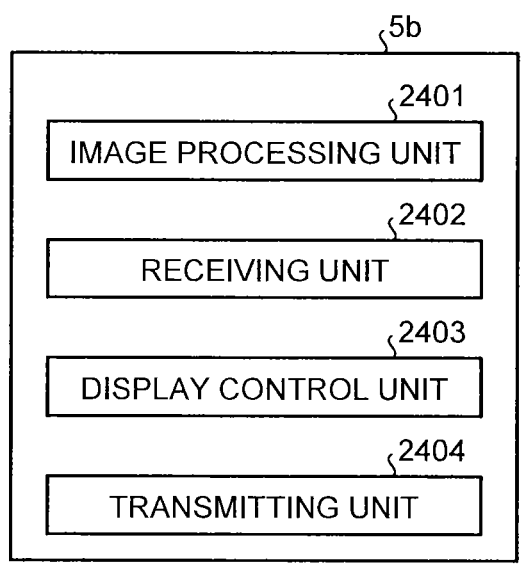
FIG. 19 is a block diagram illustrating a functional configuration of an information processing apparatus according to a second embodiment.

FIG. 19 is a block diagram illustrating a functional configuration of a conference device 5b according to the second embodiment. As illustrated in FIG. 19, the CPU 59 of the conference device 5b loads a program stored in the recording device 56 or the like into the memory 57 and executes the program to thereby function as an image processing unit 2401, a receiving unit 2402, a display control unit 2403, and a transmitting unit 2404.

In the explanation below, a case is described that a conference device 5b-1 (subject device) installed in a first location conducts a video conference with a conference device 5b-2 (external device) installed in a second location (another location). However, the same applies when the video conference is conducted with conference devices 5b-3 and 5b-4 installed in the other locations. Furthermore, in the explanation below, a case is described that the conference device 5b-1 functions as both of a captured-image transmission side and a captured-image reception side. However, it is sufficient that the conference device 5b-1 functions as at least the image processing unit 2401 and the receiving unit 2402 when serving as the captured-image transmission side (an example of an image processing apparatus), and functions as at least the display control unit 2403 and the transmitting unit 2404 when serving as the captured-image reception side.

The image processing unit 2401 performs predetermined image processing on a captured image obtained by capturing, by the camera 51, the first location in which the conference device 5b-1 is installed (or image processing designated by the conference device 5b-2 installed in the second location), and transmits the captured image subjected to the image processing to the conference device 5b-2 (external device) installed in the second location (another location) different from the first location. When performing the image processing designated by the conference device 5b-2, the image processing unit 2401 performs the image processing on the captured image according to processing information received by the receiving unit 2402 to be described below.

The receiving unit 2402 receives the processing information (for example, an image processing method or the like) that designates the image processing to be performed on the captured image from the conference device 5b-2 installed in the second location.

The display control unit 2403 acquires the captured image subjected to the image processing from the conference device 5b-2 (external device), which is installed in the second location (another location) different from the first location where the subject device is installed and which performs the image processing on the captured image of the second location, and displays the captured image on the display unit 54 of the conference device 5b-1 installed in the first location.

The transmitting unit 2404 transmits the processing information (for example, an image processing method or the like) that designates the image processing to be performed on the captured image to the conference device 5b-2 in the second location, and causes the conference device 5b-2 in the second location to perform the image processing according to the processing information.

Figure 20:
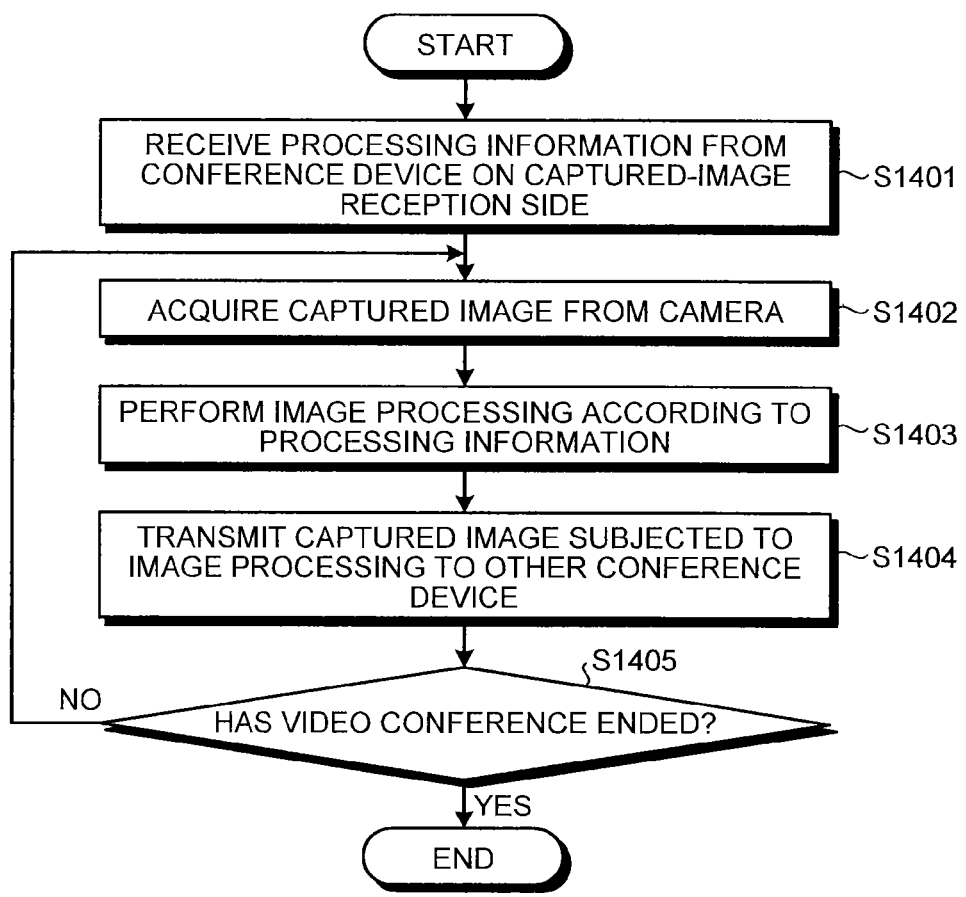
FIG. 20 is a flowchart illustrating the flow of video conference control performed by an information processing apparatus serving as a captured-image transmission side.

The flow of video conference control performed by the conference device 5b-1 serving as the captured-image transmission side will be explained below with reference to FIG. 20. FIG. 20 is a flowchart illustrating the flow of the video conference control performed by the information processing apparatus serving as the captured-image transmission side.

The receiving unit 2402 receives the processing information from the conference device 5b-2 in the second location serving as the captured-image reception side (Step S1401). In the second embodiment, the receiving unit 2402 receives processing information for performing image processing to enlarge a part of the captured image (for example, a center portion of the captured image) (hereinafter, referred to as "partial enlargement"), and processing information for performing image processing to correct distortion of the captured image (hereinafter, referred to as "distortion correction").

In the second embodiment, the receiving unit 2402 receives the processing information for performing the image processing of the partial enlargement or the distortion correction as an image processing method to be performed by the subject device. Any image processing may be designated by the processing information and may be executed as long as the subject device can execute the image processing. For example, the receiving unit 2402 may receive, from the conference device 5b-2 installed in the second location, processing information for performing image processing, such as extraction of a partial image from the image captured by the camera 51 of the conference device 5b-1 installed in the first location, brightness adjustment to optimize the contrast of each of pixels of the captured image (a so-called bright face function), or backlight adjustment to correct the captured image that is dark due to the backlight, and the image processing unit 2401 (to be described later) may perform the image processing, such as the extraction of a partial image from the captured image, the bright face function, or the backlight adjustment. The conference device 5b on the captured-image transmission side may transmit the image processing that the transmission-side conference device 5b can perform (for example, the partial enlargement, the distortion correction, or the like) to the conference device 5b on the captured-image reception side in advance, and may receive the processing information designating the image processing that the transmission-side conference device 5b can perform. Alternatively, the conference device 5b on the captured-image transmission side may receive the processing information designating image processing desired by a user of the conference device 5b on the captured-image reception side regardless of whether the transmission-side conference device 5b is able to perform the image processing, and may perform predetermined image processing when the transmission-side conference device 5b is unable to perform the image processing according to the received processing information.

The image processing unit 2401 acquires, from the camera 51, the image captured by the camera 51 (Step S1402). Subsequently, the image processing unit 2401 performs image processing on the acquired image according to the processing information received by the receiving unit 2402 (Step S1403). For example, if the received processing information designates the partial enlargement as an image processing method of the image processing, the image processing unit 2401 obtains the image data I23 by performing, on the acquired image data I1, the partial enlargement to enlarge the conferee P1 who is speaking among the three conferees P1, P2, and P3 contained in the image data I1 as illustrated in FIG. 5.

In contrast, if the received processing information designates the distortion correction, the image processing unit 2401 obtains the image data I21 by performing, on the acquired image data I1, the distortion correction to reduce the size of the peripheral portion (areas containing the conferees P2 and P3) of the image data I1 as illustrated in FIG. 4.

The image processing unit 2401 transmits the captured image subjected to the image processing to the conference device 5b-2 (another information processing apparatus) installed in the second location via the network N (Step S1404). Therefore, the conference device 5b-2 installed in the second location can display the captured image subjected to the desired image processing on the display unit 54 of the conference device 5b-2 installed in the second location. Consequently, when the captured image of the first location is subjected to the image processing and thereafter transmitted to the conference device 5b-2 installed in the second location, it is possible to match the captured image that a conferee in the second location wants to view and the image to be actually displayed, so that the user's usability can be improved.

Furthermore, the conference device 5b-2 installed in the second location serving as the captured-image reception side need not perform image processing to obtain a captured image as desired by the user of the subject device. Therefore, it becomes not necessary to store the characteristics of the camera 51 (for example, the type of a lens of the camera 51) of the conference device 5b-1 installed in the first location serving as the captured-image transmission side. Moreover, the conference device 5b-2 installed in the second location serving as the captured-image reception side need not perform image processing on the captured image to be displayed. Therefore, it becomes possible to reduce processing load on the captured image due to the image processing, enabling to improve the processing performance of other processes.

The image processing unit 2401 and the receiving unit 2402 repeat the processes from Step S1402 to Step S1404 until the video conference with the conference device 5b-2 installed in the second location ends (NO at Step S1405).

Figure 21:
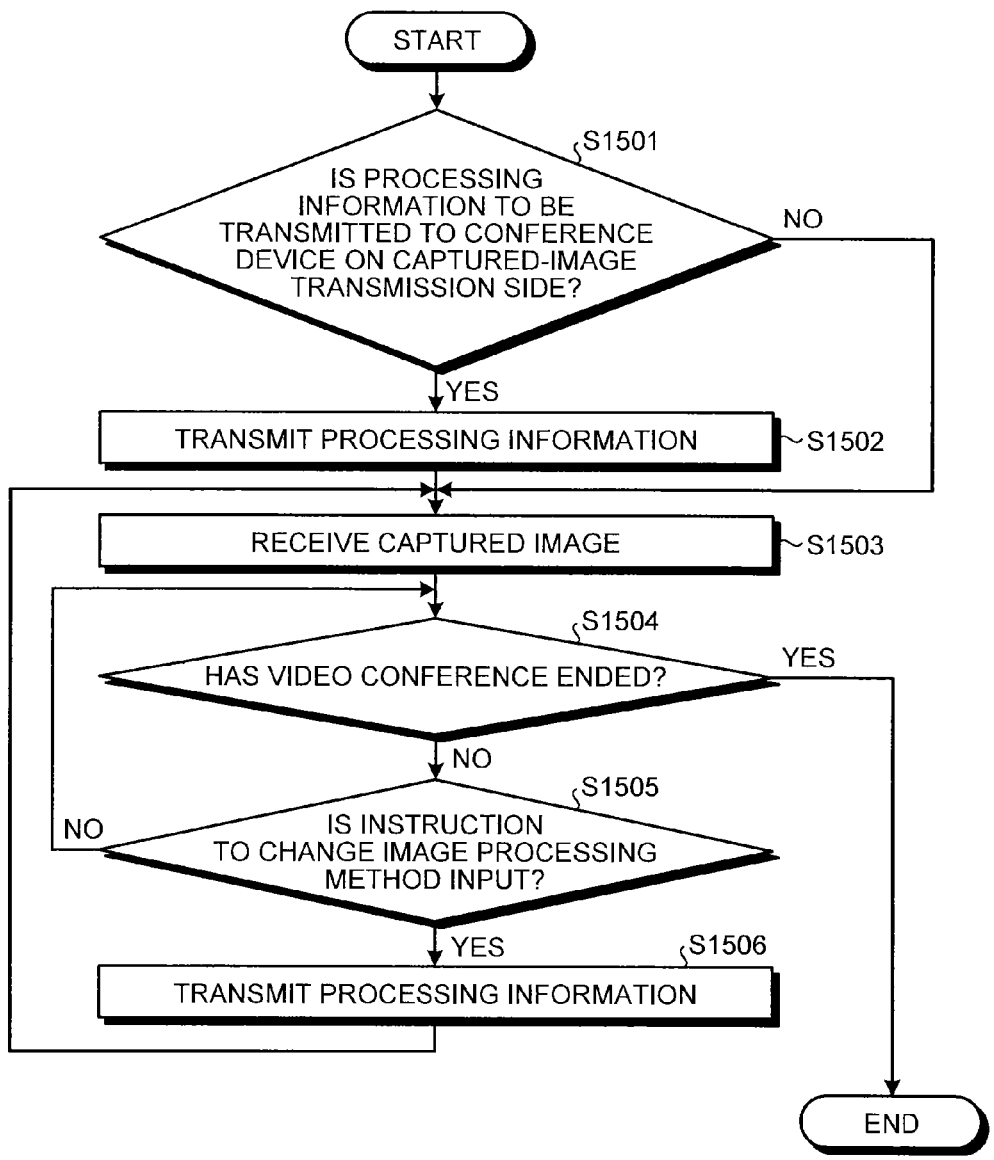
FIG. 21 is a flowchart illustrating the flow of video conference control performed by an information processing apparatus serving as a captured-image reception side.

The flow of video conference control performed by the conference device 5b-1 serving as the captured-image reception side will be explained below with reference to FIG. 21. FIG. 21 is a flowchart illustrating the flow of the video conference control performed by the information processing apparatus serving as the captured-image reception side.

The transmitting unit 2404 determines whether to transmit the processing information to the conference device 5b-2 on the captured-image transmission side according to operation input through the operating unit 53 by a user (for example, a conferee) of the conference device 5b-1 installed in the first location (Step S1501).

When transmitting the processing information to the conference device 5b-2 on the captured-image transmission side (YES at Step S1501), the transmitting unit 2404 transmits the processing information designating the image processing method input through the operating unit 53 to the conference device 5b-2 installed in the second location via the network N (Step S1502). In the second embodiment, the transmitting unit 2404 transmits the processing information for performing the image processing to perform the partial enlargement or the distortion correction to the conference device 5b-2 installed in the second location. Furthermore, in the second embodiment, a general-purpose Internet protocol is used when the transmitting unit 2404 transmits the processing information to the conference device 5b-2 installed in the second location.

Therefore, it is possible to cause the conference device 5b-2 installed in the second location to perform the image processing on the captured image of the second location as desired by the user (for example, the conferee) of the conference device 5b-1 installed in the first location. Consequently, when the captured image of the second location is subjected to the image processing and thereafter transmitted to the conference device 5b-1 installed in the first location, it is possible to match the captured image that a conferee in the first location wants to view and the image to be actually displayed, so that the user's usability can be improved.

Furthermore, the conference device 5b-1 installed in the first location serving as the captured-image reception side need not perform image processing to obtain a captured image as desired by the user of the subject device. Therefore, it becomes not necessary to store the characteristics of the camera 51 (for example, the type of a lens of the camera 51) of the conference device 5b-2 installed in the second location serving as the captured-image transmission side. Moreover, the conference device 5b-1 installed in the first location serving as the captured-image reception side need not perform image processing on the captured image to be displayed. Therefore, it becomes possible to reduce processing load on the captured image due to the image processing, enabling to improve the processing performance of other processes.

In the second embodiment, the transmitting unit 2404 transmits the processing information for performing the image processing of the partial enlargement or the distortion correction. Any image processing may be designated by the processing information and may be performed as long as the conference device 5b-2 installed in the second location can perform the image processing. For example, the transmitting unit 2404 may transmit, to the conference device 5b-2 installed in the second location, processing information for performing image processing, such as extraction of a partial image from the image captured by the camera 51 of the conference device 5b-2 installed in the second location, brightness adjustment to optimize the contrast of each of pixels of the captured image (a so-called bright face function), or backlight adjustment to correct the captured image that is dark due to the backlight, in order to perform the image processing, such as the extraction of a partial image from the captured image, the bright face function, or the backlight adjustment. The conference device 5b on the captured-image reception side may acquire the image processing that the transmission-side conference device 5b can perform (for example, the partial enlargement, the distortion correction, or the like) from the conference device 5b on the captured-image transmission side in advance, and may transmit the processing information designating the image processing that the conference device 5b on the captured-image transmission side can perform. Alternatively, the conference device 5b on the captured-image reception side may transmit the processing information designating image processing desired by a user regardless of whether the transmission-side conference device 5b is able to perform the image processing, and may receive the captured image subjected to the predetermined image processing when the transmission-side conference device 5b is unable to the image processing according to the transmitted processing information.

When the processing information is transmitted (Step S1502 or Step S1506 to be described later) or when transmission of the processing information is not instructed (NO at Step S1501), the display control unit 2403 receives the captured image subjected to the image processing designated by the transmitted processing information from the conference device 5b-2 on the captured-image transmission side (the conference device 5b-2 installed in the second location) via the network N (Step S1503). Then, the display control unit 2403 displays the received captured image on the display unit 54.

Subsequently, the transmitting unit 2404 determines whether the video conference has ended (Step S1504). If the video conference has not ended (NO at Step S1504), the transmitting unit 2404 determines whether an instruction to change the image processing performed by the conference device 5b-2 installed in the second location is input via the operating unit 53 (Step S1505). If the instruction to change the image processing is not input (NO at Step S1505), the display control unit 2403 repeatedly receives and displays the captured image until the video conference ends.

In contrast, if the instruction to change the image processing is input (YES at Step S1505), the transmitting unit 2404 re-transmits the processing information input via the operating unit 53 to the conference device 5b-2 installed in the second location via the network N (Step S1506). For example, if the distortion correction is designated as the image processing by the processing information transmitted at Step S1502, the transmitting unit 2404 transmits the processing information for performing the image processing to perform the partial enlargement to the conference device 5b-2 installed in the second location.

Figure 22:
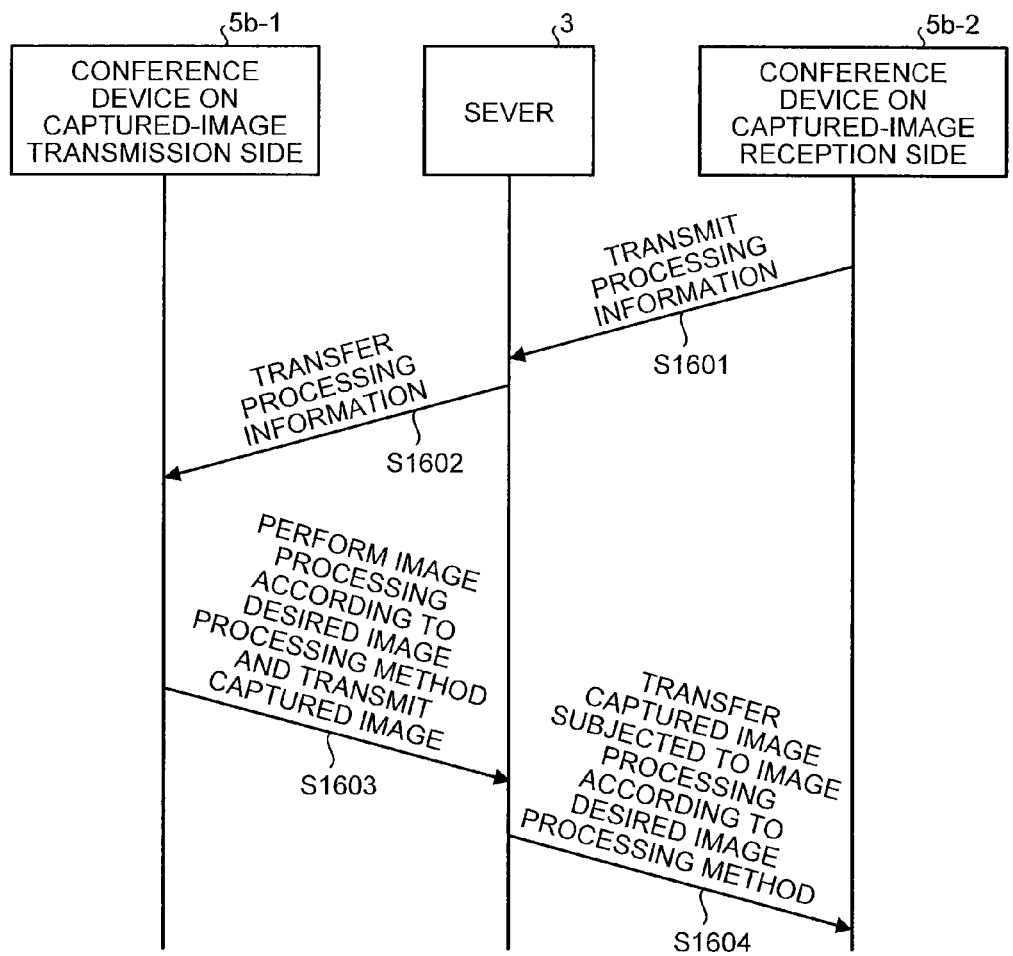
FIG. 22 is a sequence diagram illustrating the flow of data in a display control system according to the second embodiment.

The flow of data (captured image) transmitted and received between the conference devices 5b-1 and 5b-2 installed in the participant locations of a video conference and the server 3 will be explained below with reference to FIG. 22. FIG. 22 is a sequence diagram illustrating the flow of data in a display control system according to the second embodiment. In the explanation below, a case is described that the captured image flows unidirectionally from the conference device 5b-1 installed in the first location to the conference device 5b-2 installed in the second location on the assumption that the conference device 5b-1 installed in the first location serves as the captured-image transmission side and the conference device 5b-2 installed in the second location serves as the captured-image reception side. However, when the video conference is actually performed, the captured image flows bi-directionally between the conference device 5b-1 installed in the first location and the conference device 5b-2 installed in the second location.

When a user of the conference device 5b-2 in the second location inputs the processing information indicating the image processing method or the like via the operating unit 53, the conference device 5b-2 (the transmitting unit 2404) in the second location transmits the processing information designating the input image processing method to the server 3 (Step S1601). The server 3 transfers the processing information transmitted by the conference device 5b-2 in the second location to the conference device 5b-1 in the first location (Step S1602).

When receiving the processing information from the server 3, the conference device 5b-1 (the image processing unit 2401) in the first location performs the image processing according to the image processing method designated by the received processing information (an image processing method desired by a conferee participating in a video conference in the second location) on the image captured by the camera 51. Then, the conference device 5b-1 in the first location transmits the captured image subjected to the image processing according to the desired image processing method (for example, the image data I21 illustrated in FIG. 4 or the image data I23 illustrated in FIG. 5) to the server 3 (Step S1603). The server 3 transfers the captured image transmitted by the conference device 5b-1 in the first location to the conference device 5b-2 in the second location (Step S1604).

In FIG. 22, an example is illustrated in which the captured image is transmitted and received between the two conference devices 5b. However, the same applies when the captured image is transmitted and received between more than two conference devices 5b.

Figure 23:
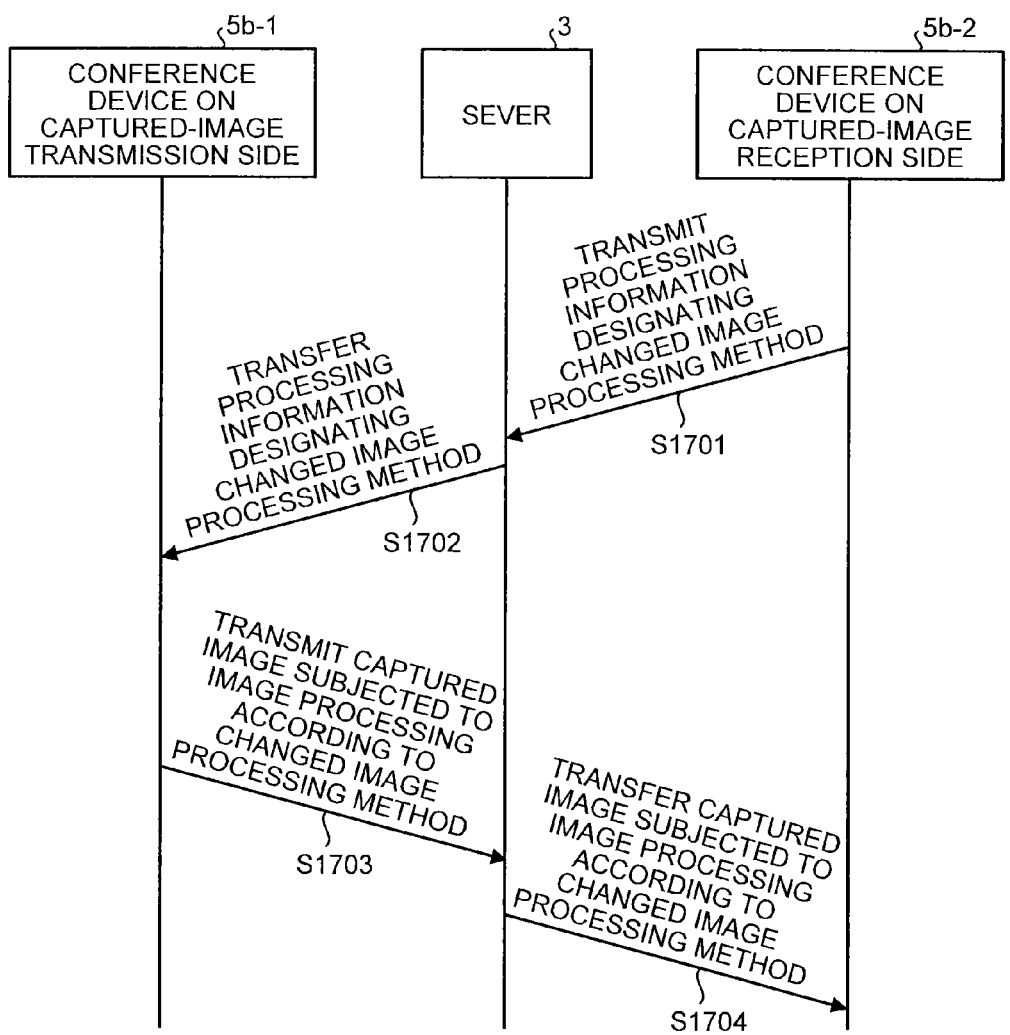
FIG. 23 is a sequence diagram illustrating the flow of data in the display control system according to the second embodiment.

With reference to FIG. 23, explanation will be given below of the flow of data (captured image) transmitted and received between the conference devices 5b-1 and 5b-2 and the server 3 when an instruction to change the image processing method is input during the video conference. FIG. 23 is a sequence diagram illustrating the flow of data in the display control system according to the second embodiment.

When an instruction to change the image processing method is input during the video conference, the conference device 5b-2 in the second location (the transmitting unit 2404) transmits the processing information designating the changed image processing method to the server 3 (Step S1701). The server 3 transfers the processing information transmitted by the conference device 5b-2 in the second location to the conference device 5b-1 in the first location (Step S1702).

When receiving the processing information from the server 3, the conference device 5b-1 (the image processing unit 2401) in the first location performs the image processing according to the changed image processing method designated by the received processing information on the image captured by the camera 51. Then, the conference device 5b-1 in the first location transmits the captured image subjected to the image processing according to the changed image processing method (for example, the image data I21 illustrated in FIG. 4 or the image data I23 illustrated in FIG. 5) to the server 3 (Step S1703). The server 3 transfers the captured image transmitted by the conference device 5b-1 in the first location to the conference device 5b-2 in the second location (Step S1704).

Figure 24:
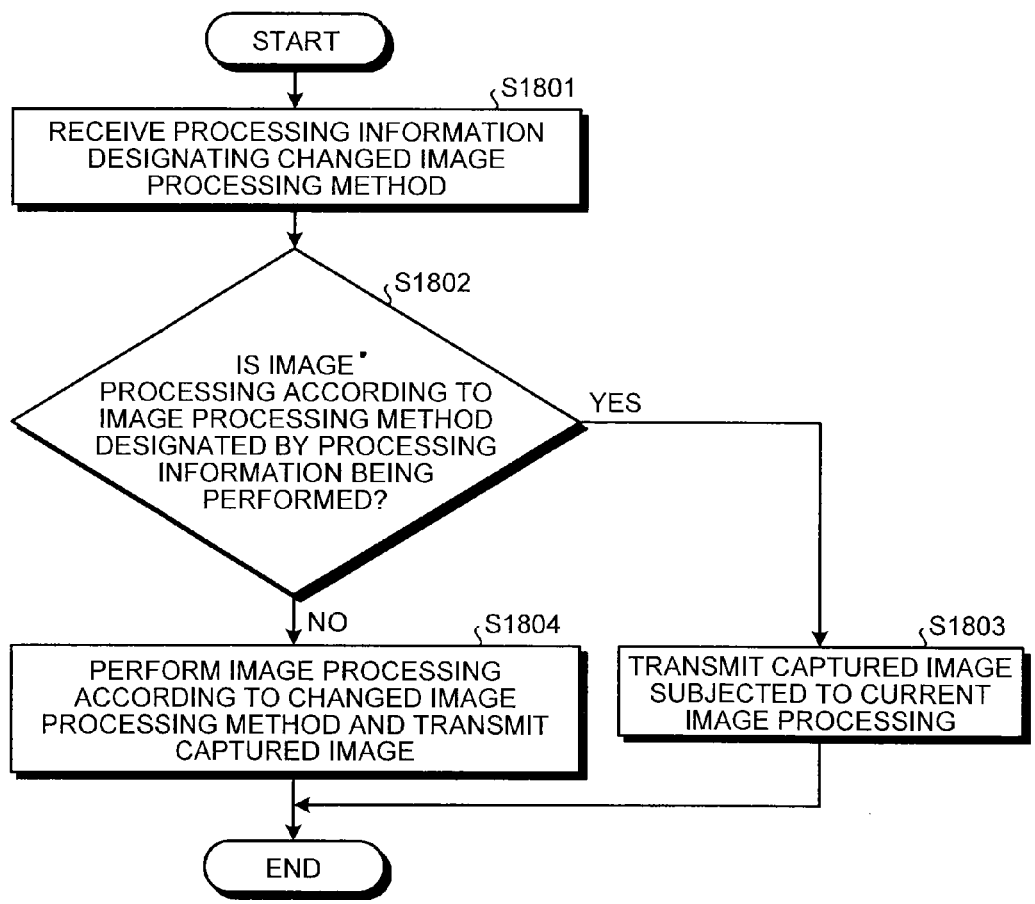
FIG. 24 is a flowchart illustrating the flow of video conference control performed by the information processing apparatus serving as the captured-image transmission side when receiving processing information indicating a changed image processing method.

The flow of video conference control performed by the conference device 5b-1 serving as the captured-image transmission side when receiving the processing information designating the changed image processing method will be explained below with reference to FIG. 24. FIG. 24 is a flowchart illustrating the flow of the video conference control performed by an information processing apparatus serving as the captured-image transmission side when receiving the processing information designating the changed image processing method.

The receiving unit 2402 of the conference device 5b-1 in the first location receives the processing information designating the changed image processing method from the conference device 5b-2 in the second location serving as the captured-image reception side during the video conference (Step S1801).

The image processing unit 2401 determines whether the changed image processing method designated by the received processing information is the same as the image processing method designated by the previously-received processing information (in other words, whether the image processing according to the changed image processing method is currently performed) (Step S1802). If the changed image processing method is currently performed (YES at Step S1802), the image processing unit 2401 executes the currently-performed image processing on the captured image acquired from the camera 51, and transmits the processed image to the conference device 5b-2 in the second location (Step S1803).

In contrast, if the changed image processing method is not currently performed (NO at Step S1802), the image processing unit 2401 performs the image processing according to the changed image processing method indicated by the received processing information on the captured image acquired from the camera 51, and transmits the processed image to the conference device 5b-2 in the second location (Step S1804).

As described above, according to the conference device 5b of the second embodiment, when acquiring a captured image subjected to image processing from another conference device 5b, which is installed in another location different from the location of the subject conference device 5b and which performs the image processing on the captured image of the another location, and then displaying the acquired captured image on the display unit 54 of the subject conference device 5b, the subject conference device 5b transmits the processing information designating the image processing to be performed on the captured image to the information processing apparatus in the another location, and causes the information processing apparatus in the another location to perform the image processing according to the processing information. Therefore, it becomes possible to cause the information processing apparatus in the another location to perform, on the captured image of the another location, the image processing as desired by a user (for example, a conferee) in the location of the subject conference device 5b. Consequently, it becomes possible to match the captured image that the conferee wants to view and the image actually displayed, so that the user's usability can be improved.

Furthermore, according to the conference device 5b of the second embodiment, when performing the image processing on a captured image obtained by the imaging unit in the location of the subject conference device 5b, and then transmitting the captured image subjected to the image processing to the information processing apparatus that is installed in another location different from the location of the subject conference device 5b and that displays the captured image on the display unit 54 installed in the another location, the subject conference device 5b receives the processing information designating the image processing to be performed on the captured image from the another information processing apparatus and performs the image processing on the captured image according to the received processing information. Therefore, the information processing apparatus installed in the another location can display the captured image subjected to the desired image processing on the display unit 54 of the information processing apparatus installed in the another location. Consequently, when the captured image of the location of the subject device is subjected to the image processing and thereafter transmitted to the information processing apparatus installed in another location, it becomes possible to match the captured image that the conferee in the another location wants to view and the image actually displayed, so that the user's usability can be improved.

In the second embodiment, a case has been explained that the video conference is conducted between the conference device 5b-1 in the first location and the conference device 5b-2 in the second location. However, for example, when the video conference is conducted among the conference devices 5b-1, 5b-2, and 5b-3 in the first to the third locations, the conference device 5b on the captured-image transmission side (for example, the conference device 5b-1 in the first location) transmits the captured image subjected to the image processing to the conference devices 5b-2 and 5b-3 in the second and the third locations via the server 3. In this case, the conference device 5b-1 in the first location gives an instruction on which captured image among the captured images subjected to different types of image processing is transmitted to each of the conference devices 5b in the multiple locations to the server 3. Therefore, the conference device 5b-1 in the first location need not transmit the captured image, so that a processing load can be reduced.

The programs executed by the conference device of the above embodiments are provided by being recorded in a computer-readable recording medium, such as a compact disc (CD)-ROM, a flexible disk (FD), or a digital versatile disk, in a computer-installable or a computer-executable file format.

Furthermore, the programs executed by the conference device of the above embodiments may be stored in a computer connected to a network, such as the Internet, and provided by being downloaded via the network. Moreover, the programs executed by the conference device of the above embodiments may be provided or distributed via a network, such as the Internet.

Furthermore, the programs executed by the conference device of the above embodiments may be provided by being incorporated into a ROM or the like in advance.

While, in the above embodiments, an example has been explained that the image processing apparatus of the present invention is applied to a personal computer, the present invention may be applied to a multifunction peripheral (MFP) having at least two of a copying function, a printing function, a scanning function, and a facsimile function, or an image processing apparatus, such as a copier, a printer, a scanner, or a facsimile machine.

According to an embodiment of the present invention, it is possible to display processed image data of the received-image display format designated by operation input by a user from among the pieces of the processed image data of the two or more types of transmission image display formats transmitted by the other conference device. Therefore, it is possible to display a conference screen as desired by a conferee.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A video conference system for holding a conference between at least two conference sites, the video conference system comprising:
    a first control device located at a first one of the at least two conference sites, the first control device being connected to a video camera;
    a second control device located at a second one of the at least two conference sites, the second control device being connected to at least a display device; and
    a server connected to the first control device and the second control device via a communication network,
    the first control device comprising circuitry configured to:
        control transmission to the server of a plurality of available image display formats each of image display formats corresponding to a different predetermined process performed to image data of a video image captured by the video camera,
    the second control device comprising circuitry configured to:
        control the display device,
        control reception from the server of the plurality of available image display formats,
        control transmission to the server of a notification of a selection of one of the image display formats,
        control reception from the server of the video image captured by the video camera of the first control device and processed according to the selected image display format, the predetermined process performed to the image data according to the selected image display format being performed externally to the second control device, and
        control display on the display device of the received video image externally processed according to the selected image display format.

2. The video conference system set forth in claim 1, wherein the video camera includes a wide-angle lens.

3. The video conference system set forth in claim 1, wherein the predetermined process includes an image distortion correction process on the image data.

4. The video conference system set forth in claim 1, wherein the predetermined process includes enlarging a desired area of the video image.

5. The video conference system set forth in claim 1, wherein
    the first control device performs the predetermined process according to the selected image display format on the image data and provides the processed image data to the server.

6. The video conference system set forth in claim 5, wherein the server transmits the image data to which the predetermined processed has been performed to the second control device without transmitting the original non-processed image data to the second control device.

7. The video conference system set forth in claim 1, wherein
    the server receives the image data from the first control device and performs the predetermined process according to the selected image display format on the image data, and provides the processed image data to the second control device.

8. The video conference system set forth in claim 7, wherein the server transmits the image data to which the predetermined processed has been performed to the second control device without transmitting the original non-processed image data to the second control device.

9. A method implemented by a video conference system for holding a conference between at least two conference sites, the video conference system including a first control device located at a first one of the at least two conference sites, the first control device being connected to a video camera, a second control device located at a second one of the at least two conference sites, the second control device being connected to at least a display device, and a server connected to the first control device and the second control device via a communication network, the method comprising:
    transmitting, by the first control device, to the server, a plurality of available image display formats each of image display formats corresponding to a different predetermined process performed to image data of a video image captured by the video camera;
    receiving, by the second control device, from the server, the plurality of available image display formats;
    transmitting, by the second control device, to the server, a notification of a selection of one of the image display formats;
    receiving, by the second control device, from the server, the video image captured by the video camera of the first control device and processed according to the selected image display format, the predetermined process performed to the image data according to the selected image display format being performed externally to the second control device; and
    displaying by the display device, the received video image externally processed according to the selected image display format.

10. A control device in a video conference system for holding a conference between at least two conference sites, the control device comprising:
    circuitry configured to:
        control transmission to the server of a plurality of available image display formats each of image display formats corresponding to a different predetermined process performed to image data of a video image captured by a video camera connected to the control device,
        control a display device connected to the control device, control reception from a server of a plurality of available image display formats at another control device, control transmission to the server of a notification of a selection of one of the received image display formats at the another control device, control reception from the server of a video image captured by a video camera connected to the another control device and processed according to the selected image display format, the predetermined process performed to the image data according to the selected image display format being performed externally to the control device, and control display on the display device of the received video image externally processed according to the selected image display format.

\* \* \* \* \*